United States Patent
Powers et al.

(10) Patent No.: US 8,760,750 B2
(45) Date of Patent: *Jun. 24, 2014

(54) THERMALLY SWITCHED ABSORPTIVE WINDOW SHUTTER

(75) Inventors: Richard M. Powers, Lakewood, CO (US); Wil McCarthy, Lakewood, CO (US)

(73) Assignee: Ravenbrick LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,720

(22) Filed: Apr. 25, 2012

(65) Prior Publication Data

US 2012/0262773 A1 Oct. 18, 2012

Related U.S. Application Data

(63) Continuation of application No. 12/340,552, filed on Dec. 19, 2008, now Pat. No. 8,169,685.

(60) Provisional application No. 61/015,598, filed on Dec. 20, 2007.

(51) Int. Cl.
| | |
|---|---|
| *G02F 1/01* | (2006.01) |
| *C09K 19/02* | (2006.01) |
| *G02B 26/02* | (2006.01) |
| *E06B 7/00* | (2006.01) |
| *G02B 13/00* | (2006.01) |
| *G02B 13/06* | (2006.01) |

(52) U.S. Cl.
CPC ............ *G02B 13/0045* (2013.01); *G02B 13/06* (2013.01)
USPC ........... 359/288; 349/167; 359/227; 52/171.3

(58) Field of Classification Search
CPC ... E06B 9/24; E06B 2009/2464; G02F 1/132; G02F 1/133514; G02F 1/133533; G02F 1/133536; G02F 2001/133538; F24J 2/407
USPC .............. 52/171.3; 257/14; 349/16, 163, 167; 359/227, 265, 275, 288
See application file for complete search history.

(56) References Cited

U.S. PATENT DOCUMENTS

| | | | |
|---|---|---|---|
| 3,990,784 | A | 11/1976 | Gelber |
| 4,006,730 | A | 2/1977 | Clapham |

(Continued)

FOREIGN PATENT DOCUMENTS

| | | |
|---|---|---|
| CA | 2620005 A1 | 7/2008 |
| CN | 1189224 A | 7/1998 |

(Continued)

OTHER PUBLICATIONS

Author Unknown, "Liquid Crystal Research", http://chirality.swarthmore.edu, printed Aug. 21, 2009.

(Continued)

*Primary Examiner* — David N Spector
(74) *Attorney, Agent, or Firm* — Dorsey & Whitney LLP

(57) ABSTRACT

The thermally switched absorptive optical shutter may be a self-regulating "switchable absorber" device that may absorb approximately 100% of incoming light above a threshold temperature, and may absorb approximately 50% of incoming light below a threshold temperature. The shutter may be formed by placing a thermotropic depolarizes between two absorptive polarizers. This control over the flow of radiant energy may occur independently of the thermal conductivity or insulation of the shutter device and may or may not preserve the image and color properties of incoming visible light. This has energy-efficiency implications as it can be used to regulate the internal temperature and illumination of buildings, vehicles, and other structures without the need for an external power supply or operator signals. The shutter device has unique optical properties that are not found in traditional windows, skylights, stained glass, light fixtures, glass blocks, bricks, or other building materials.

20 Claims, 10 Drawing Sheets

(56) References Cited

U.S. PATENT DOCUMENTS

| | | | |
|---|---|---|---|
| 4,155,895 A | 5/1979 | Rohowetz |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,579,638 A | 4/1986 | Scherber |
| 4,640,583 A | 2/1987 | Hoshikawa et al. |
| 4,641,922 A | 2/1987 | Jacob |
| 4,688,900 A | 8/1987 | Doane et al. |
| 4,688,901 A | 8/1987 | Albert |
| 4,755,673 A | 7/1988 | Pollack et al. |
| 4,756,758 A | 7/1988 | Lent |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudt |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,226,067 B1 | 5/2001 | Nishiguchi |
| 6,240,114 B1 | 5/2001 | Anselm |
| 6,260,414 B1 | 7/2001 | Brown |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada |
| 6,437,361 B1 | 8/2002 | Matsuda |
| 6,446,402 B1 | 9/2002 | Byker |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz |
| 6,611,640 B2 | 8/2003 | LoCasclo |
| 6,635,898 B2 | 10/2003 | Williams |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. |
| 6,770,916 B2 | 8/2004 | Ohshima |
| 6,777,718 B2 | 8/2004 | Takagi |
| 6,816,525 B2 | 11/2004 | Stintz |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson |
| 7,276,432 B2 | 10/2007 | McCarthy et al. |
| 7,300,167 B2 | 11/2007 | Fernando et al. |
| 7,318,651 B2 | 1/2008 | Chua |
| 7,351,346 B2 | 4/2008 | Little |
| 7,385,659 B2 | 6/2008 | Kotchick |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little |
| 7,601,946 B2 | 10/2009 | Powers |
| 7,619,816 B2 | 11/2009 | Deng |
| 7,655,942 B2 | 2/2010 | McCarthy |
| 7,692,180 B2 | 4/2010 | Snyder |
| 7,755,829 B2 | 7/2010 | Powers et al. |
| 7,768,693 B2 | 8/2010 | McCarthy et al. |
| 7,911,563 B2 | 3/2011 | Hung |
| 7,936,500 B2 | 5/2011 | Powers |
| 7,977,621 B2 | 7/2011 | McCarthy |
| 8,072,672 B2 | 12/2011 | Powers |
| 8,076,661 B2 | 12/2011 | McCarthy |
| 8,169,685 B2 * | 5/2012 | Powers et al. ................ 359/288 |
| 8,271,241 B2 | 9/2012 | Akyurtlu |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris |
| 2002/0141029 A1 | 10/2002 | Carlson |
| 2002/0152191 A1 | 10/2002 | Hollenberg |
| 2002/0180916 A1 | 12/2002 | Schadt et al. |
| 2002/0190249 A1 | 12/2002 | Williams |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0218712 A1 | 11/2003 | Kumar et al. |

(56) References Cited

U.S. PATENT DOCUMENTS

| | | |
|---|---|---|
| 2003/0227663 A1 | 12/2003 | Agrawal |
| 2004/0005451 A1 | 1/2004 | Kretman |
| 2004/0012749 A1 | 1/2004 | Freeman |
| 2004/0036993 A1 | 2/2004 | Tin |
| 2004/0256612 A1 | 12/2004 | Mohseni |
| 2005/0068629 A1 | 3/2005 | Fernando et al. |
| 2005/0185125 A1 | 8/2005 | Miyachi |
| 2005/0221128 A1 | 10/2005 | Kochergin |
| 2005/0271092 A1 | 12/2005 | Ledentsov |
| 2006/0147810 A1 | 7/2006 | Koch |
| 2006/0151775 A1 | 7/2006 | Hollenberg |
| 2006/0238867 A1 | 10/2006 | Takeda |
| 2006/0257090 A1 | 11/2006 | Podolskiy |
| 2006/0262398 A1 | 11/2006 | Sangu et al. |
| 2006/0274218 A1 | 12/2006 | Xue |
| 2007/0070276 A1 | 3/2007 | Tan |
| 2007/0121034 A1 | 5/2007 | Ouderkirk |
| 2007/0215843 A1 | 9/2007 | Soukoulis et al. |
| 2007/0279727 A1 | 12/2007 | Ghandi |
| 2008/0013174 A1 | 1/2008 | Allen |
| 2008/0061222 A1 | 3/2008 | Powers et al. |
| 2008/0117500 A1 | 5/2008 | Narendran et al. |
| 2008/0138543 A1 | 6/2008 | Hoshino |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128907 A1 | 5/2009 | Takahashi |
| 2009/0219603 A1 | 9/2009 | Xue |
| 2009/0296190 A1 | 12/2009 | Anderson |
| 2010/0015363 A1 | 1/2010 | Chiang et al. |
| 2010/0027099 A1 | 2/2010 | McCarthy |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0271686 A1 | 10/2010 | Powers et al. |
| 2010/0288947 A1 | 11/2010 | McCarthy et al. |
| 2011/0044061 A1 | 2/2011 | Santoro |
| 2011/0205650 A1 | 8/2011 | Powers et al. |
| 2011/0216254 A1 | 9/2011 | McCarthy et al. |
| 2012/0140311 A1 | 6/2012 | Powers et al. |

FOREIGN PATENT DOCUMENTS

| | | |
|---|---|---|
| CN | 1350648 A | 5/2002 |
| CN | 1494091 A | 5/2004 |
| EP | 1162496 | 12/2001 |
| GB | 2261989 | 6/1993 |
| JP | 58-010717 | 1/1983 |
| JP | 59-231516 | 12/1984 |
| JP | 61-223719 | 10/1986 |
| JP | 1178517 | 7/1989 |
| JP | 02-089426 | 3/1990 |
| JP | 06-158956 | 6/1994 |
| JP | 07-043526 | 2/1995 |
| JP | 08-015663 | 1/1996 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-291345 | 10/2004 |
| JP | 2005-250119 | 9/2005 |
| JP | 2006-330108 | 7/2006 |
| JP | 2006-243485 | 9/2006 |
| JP | 2006-285242 | 10/2006 |
| JP | 2007-515661 | 6/2007 |
| JP | 2007-272016 | 10/2007 |
| JP | 2007-322902 | 12/2007 |
| JP | 2008-530766 | 8/2008 |
| JP | 2008-304618 | 12/2008 |
| JP | 2009-046742 | 3/2009 |
| KR | 2002-0044153 | 6/2002 |
| KR | 2003-0072578 | 9/2003 |
| KR | 10-2004-0048916 | 6/2004 |
| KR | 10-2004-0108816 | 12/2004 |
| KR | 10-2006-0000059 | 1/2006 |
| KR | 10-2007-0091314 | 9/2007 |
| KR | 10-2010-0039401 | 4/2010 |
| WO | 94/02313 A1 | 2/1994 |
| WO | 97/01789 A2 | 1/1997 |
| WO | 01/23173 A1 | 4/2001 |
| WO | 02/064937 A1 | 8/2002 |
| WO | 03/029885 A1 | 4/2003 |
| WO | 03/096105 A1 | 11/2003 |
| WO | 2005/031437 A1 | 4/2005 |
| WO | 2006/023195 A2 | 3/2006 |
| WO | 2006/036546 | 4/2006 |
| WO | 2006/088369 A2 | 8/2006 |
| WO | 2008/092038 A1 | 7/2008 |
| WO | 2008/106596 A1 | 9/2008 |
| WO | 2008/144217 A1 | 11/2008 |

OTHER PUBLICATIONS

Barbagallo, S., et al., "Synthesis of novel metamaterials," Chapter 2 (VDM Verlag 2008).

Eleftheriades, G.V., et al. (Editors); Iyers, "Negative-Refraction Metamaterials," Chapter 1 (Wiley 2005), pp. 4-5, 16-30, 321-330.

Fan, et al., "Thin-film conducting microgrids as transparent heat mirrors", Appl. Phys. Lett., vol. 28, No. 8, Apr. 5, 1976, 440-442.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, D., et al., "Overview of Nanoelectronic Devices", Proceedings of the IEEE, 85(4):521-533, Apr. 1997.

Hao, J. et al., "Manipulating Electromagnetic Wave Polarizations by Anisotropic Metamaterials," Physical Review Letters, 2007, vol. 99, No. 063908.

Harrison, "Quantum Wells, Wires, and Dots: Theoretical & Computational Physics of Semiconductor Nanostructures" 2nd Edition, John Wiley & Sons, LTD (2005), 3 pages.

Lan, S., et al., "Survey on Roller-type Nanoimprint Lithography (RNIL) Process," International Conference on Smart Manufacturing Application, Apr. 9-11, 2008, in Kintex, Gyeonggi-do, Korea, pp. 371-376.

Leatherdale, C.A., et al., "Photoconductivity in CdSe Quantum Dot Solids", Phys. Review B, 62(4):2669-2680, Jul. 15, 2000.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Sarychev, et al., "Negative refraction metamaterials," Chapter 8 (Wiley 2005).

Siegel, J. D., "The MSVD Low E 'Premium Performance' Myth," International Glass Review, Issue 1, 2002, pp. 55-58.

Sung, J., et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

(56) References Cited

OTHER PUBLICATIONS

West, J. L., et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.
Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.
Zhang, W., Giant optical activity in dielectric planar metamaterials with two-dimensional chirality, Journal of Optics A: Pure and Applied Optics, 8, pp. 878-890 (2006).
Restriction Requirement dated Dec. 14, 2009, U.S. Appl. No. 12/019,602, 12 pages.
Response to Restriction Requirement filed Jan. 14, 2010, U.S. Appl. No. 12/019,602, 15 pages.
Notice of Allowance dated Jun. 9, 2010, U.S. Appl. No. 12/019,602, 7 pages.
Voluntary Amendment dated Jan. 11, 2010, AU Application No. 2008207802, 49 pages.
First Office Action dated Sep. 15, 2010, AU Application No. 2008207802, 2 pages.
Response to First Office Action dated Jul. 4, 2011, AU Application No. 2008207802, 9 pages.
Notice of Acceptance mailed Jul. 14, 2011, AU Application No. 2008207802, 3 pages.
Notice of Allowance dated Jul. 28, 2010, CA Application No. 2,620,005, 1 page.
First Office Action dated Aug. 4, 2010 (with English translation), CN Application No. 200880009550.2, 12 pages.
Response to First Office Action dated Feb. 19, 2011 (with English summary), CN Application No. 200880009550.2, 21 pages.
Second Office Action dated Apr. 6, 2011 (with English summary), CN Application No. 200880009550.2, 4 pages.
Response to Second Office Action dated Aug. 2, 2011 (with English summary), CN Application No. 200880009550.2, 16 pages.
Notice of Allowance mailed Nov. 3, 2011 (with English summary), CN Application No. 200880009550.2, 4 pages.
First Office Action dated Mar. 5, 2013 (with English summary), JP Application No. 2009-547428, 5 pages.
Supplemental European Search Report dated May 9, 2011, EP Application No. 08713990.3, 7 pages.
Communication Pursuant to Rules 70(2) and 70a(2) dated May 26, 2011, EP Application No. 08713990.3, 1 page.
Response to Invitation to Proceed filed Nov. 29, 2011, EP Application No. 08713990.3, 18 pages.
Restriction Requirement dated Jan. 26, 2011, U.S. Appl. No. 12/843,218, 8 pages.
Response to Restriction Requirement filed Mar. 28, 2011, U.S. Appl. No. 12/843,218, 8 pages.
Notice of Allowance dated Apr. 12, 2011, U.S. Appl. No. 12/843,218, 9 pages.
Request for Continued Examination filed Jul. 11, 2011, U.S. Appl. No. 12/843,218, 1 page.
Notice of Allowance dated Jul. 22, 2011, U.S. Appl. No. 12/843,218, 8 pages.
Restriction Requirement dated Nov. 14, 2012, U.S. Appl. No. 13/107,626, 15 pages.
Response to Restriction Requirement filed Feb. 14, 2013, U.S. Appl. No. 13/107,626, 8 pages.
Notice of Allowance dated Mar. 20, 2013, U.S. Appl. No. 13/107,626, 13 pages.
Request for Continued Examination dated Jun. 20, 2013, U.S. Appl. No. 13/107,626, 3 pages.
Notice of Allowance dated Nov. 23, 2009, U.S. Appl. No. 12/172,156, 9 pages.
Request for Continued Examination filed Jan. 29, 2010, U.S. Appl. No. 12/172,156, 1 page.
Amendment filed Jan. 29, 2010, U.S. Appl. No. 12/172,156, 11 pages.
Notice of Allowance dated Mar. 11, 2010, U.S. Appl. No. 12/172,156, 6 pages.
First Office Action dated Jan. 13, 2011, AU Application No. 2008274933, 1 page.
Response to First Office Action dated Aug. 4, 2011, AU Application No. 2008274933, 17 pages.
Second Office Action dated Aug. 9, 2011, AU Application No. 2008274933, 3 pages.
Response to Second Office Action dated Feb. 16, 2012, AU Application No. 2008274933, 10 pages.
Notice of Acceptance mailed Feb. 22, 2012, AU Application No. 2008274933, 3 pages.
Preliminary Amendment dated Feb. 23, 2010, CA Application No. 2,693,022, 3 pages.
First Office Action mailed Jul. 21, 2010, CA Application No. 2,693,022, 3 pages.
Response to First Office Action filed Jan. 21, 2011, CA Application No. 2,693,022, 14 pages.
Notice of Allowance dated Mar. 2, 2011, CA Application No. 2,693,022, 1 page.
First Office Action dated Jan. 27, 2011 (with English translation), CN Application No. 200880106571.6, 14 pages.
Response to First Office Action dated Aug. 10, 2011 (with English summary), CN Application No. 200880106571.6, 66 pages.
Second Office Action dated Nov. 22, 2011 (with English translation), CN Application No. 200880106571.6, 9 pages.
Response to Second Office Action dated Apr. 6, 2012 (with English summary), CN Application No. 200880106571.6, 27 pages.
Notice of Issuance mailed Aug. 14, 2012 (with English summary), CN Application No. 200880106571.6, 4 pages.
First Office Action dated Jun. 19, 2012 (with English translation), JP Application No. 2010-516287, 5 pages.
Response to First Office Action dated Dec. 6, 2012 (with English summary), JP Application No. 2010-516287, 12 pages.
Supplemental European Search Report dated Aug. 9, 2011, EP Application No. 08826231.6, 7 pages.
Communication Pursuant to Rules 70(2) and 70a(2) dated Aug. 26, 2011, EP Application No. 08826231.6, 1 page.
Response to EPO Communications filed Feb. 22, 2012, EP Application No. 08826231.6, 18 pages.
Voluntary Amendment dated Feb. 16, 2010 (with English translation), KR Application No. 10-2010-7003004, 32 pages.
First Office Action dated Jun. 10, 2011 (with English translation), KR Application No. 10-2010-7003004, 5 pages.
Response to First Office Action dated Nov. 10, 2011 (with English summary), KR Application No. 10-2010-7003004, 19 pages.
Second Office Action dated Apr. 30, 2012 (with English translation), KR Application No. 10-2010-7003004, 5 pages.
Response to Second Office Action dated Oct. 31, 2012 (with English summary), KR Application No. 10-2010-7003004, 25 pages.
Korean Intellectual Property Office as International Searching Authority, International Search Report and Written Opinion for International Application No. PCT/US2008/069881, Sep. 30, 2008, 10 pages.
Non-final Office Action dated Jan. 7, 2011, U.S. Appl. No. 12/830,068, 5 pages.
Terminal Disclaimer filed Jul. 7, 2011, U.S. Appl. No. 12/830,068, 1 page.
Response to Non-final Office Action filed Jul. 7, 2011, U.S. Appl. No. 12/830,068, 6 pages.
PTO Response to Terminal Disclaimer dated Aug. 3, 2011, U.S. Appl. No. 12/830,068, 1 page.
Notice of Allowance dated Aug. 22, 2011, U.S. Appl. No. 12/830,068, 7 pages.
Notice of Allowance dated Sep. 22, 2011, U.S. Appl. No. 12/340,552, 11 pages.
Request for Continued Examination and Amendment filed Dec. 21, 2011, U.S. Appl. No. 12/340,552, 13 pages.
Notice of Allowance dated Jan. 27, 2012, U.S. Appl. No. 12/340,552, 7 pages.
First Office Action mailed May 24, 2011, AU Application No. 2008345570, 2 pages.

(56) References Cited

OTHER PUBLICATIONS

Response to First Office Action filed Aug. 1, 2011, AU Application No. 2008345570, 1 page.
Notice of Acceptance mailed Nov. 29, 2011, AU Application No. 2008345570, 3 pages.
First Office Action mailed Apr. 14, 2011, CA Application No. 2,710,217, 3 pages.
Response to First Office Action filed Oct. 14, 2011, CA Application No. 2,710,217, 14 pages.
Notice of Allowance dated Feb. 3, 2012, , CA Application No. 2,710,217, 1 page.
First Office Action dated Dec. 12, 2011 (with English summary), CN Application No. 200880124576.1, 6 pages.
Response to First Office Action filed Apr. 27, 2012 (with English summary), CN Application No. 200880124576.1, 25 pages.
Second Office Action dated Oct. 8, 2012 (with English summary), CN Application No. 200880124576.1, 4 pages.
Response to Second Office Action dated Feb. 22, 2013 (with English summary), CN Application No. 200880124576.1, 20 pages.
Voluntary Amendment filed Jan. 23, 2011, (with English summary), JP Application No. 2010-539931, 26 pages.
First Office Action dated Dec. 4, 2012 (with English summary), JP Application No. 2010-539931, 6 pages.
Response to First Office Action filed May 31, 2013 (with English summary), JP Application No. 2010-539931, 22 pages.
Preliminary Claim Amendments filed Oct. 20, 2010, KR Application No. 10-2010-7016005, 16 pages.
First Office Action mailed Sep. 30, 2011 (with English summary), KR Application No. 10-2010-7016005, 1 page.
Response to First Office Action filed Oct. 7, 2011 (with English summary), KR Application No. 10-2010-7016005, 16 pages.
Extended European Search Report dated Aug. 9, 2011, EP Application No. 08713990.3, 7 pages.
Response to Search Report filed Feb. 22, 2012, EP Application No. 08713990.3, 20 pages.
Korean Intellectual Property Office as International Searching Authority, International Search Report and Written Opinion for International Application No. PCT/US2008/087964, Mar. 31, 2009, 11 pages.
Examination Report dated Jul. 1, 2013, EP Application No. 08713990.3, 4 pages.
Korean Intellectual Property Office as International Searching Authority, International Search Report and Written Opinion for International Application No. PCT/US2008/051959, Jun. 3, 2008, 10 pages.
Examination Report dated Jul. 19, 2013, EP Application No. 08826231.6, 4 pages.
Non-Final Office Action dated Jul. 26, 2013, U.S. Appl. No. 13/311,212, 4 pages.
Examination Report dated Jul. 1, 2013, EP Application No. 08868343.8, 4 pages.
Third Office Action dated Jul. 2, 2013 (with English summary), CN Application No. 200880124576.1, 8 pages.

\* cited by examiner

THERMALLY SWITCHED ABSORPTIVE WINDOW SHUTTER

CROSS REFERENCE TO RELATED APPLICATIONS

This application is a continuation of U.S. patent application Ser. No. 12/340,552 filed 19 Dec. 2008, now U.S. Pat. No. 8,169,685, entitled "Thermally switched absorptive window shutter", which claims the benefit of priority pursuant to 35 U.S.C. §119(e) of U.S. provisional patent application No. 61/015,598 filed 20 Dec. 2007 entitled "Thermally Switched Absorptive Liquid Crystal Window Shutter," which are hereby incorporated by reference as if fully set forth herein.

This application is also related to U.S. patent application Ser. No. 12/172,156 filed 11 Jul. 2008, now U.S. Pat. No. 7,755,829, entitled "Thermally switched reflective optical shutter."

TECHNICAL FIELD

This disclosure relates to solid-state devices for controlling light and radiant heat through selective absorption. More specifically, this disclosure relates to passive and/or active light-regulating and temperature-regulating films, materials and devices.

BACKGROUND

Various applications such as regulating solar heat gain in buildings may use optical methodologies to control the flow of radiant energy (e.g., light and heat). For example, photodarkening materials which have been commonly used in sunglass lenses to selectively attenuate incoming light when stimulated by ultraviolet ("UV") radiation, may be incorporated into windows. Such materials can be used to regulate the internal temperature of a structure by darkening to attenuate bright sunlight, and by becoming transparent again to allow artificial light or diffuse daylight to pass through unimpeded. Such systems are passive and self-regulating, requiring no external signal other than ambient UV light in order to operate. However, because they are controlled by UV light rather than by temperature, such systems are of limited utility in temperature-regulating applications. For example, they may block wanted sunlight in cold weather as well as unwanted sunlight in hot weather.

In another example of controlling the flow of radiant energy, a system may use thermodarkening materials, which may change color and may increase the amount of light absorbed by the material as the temperature of the material increases or decreases past a predetermined value. For example, Pletotint Corporation of West Olive, Mich. produces a thermodarkening material which can be laminated between two sheets of glass and incorporated into a window.

In addition, electrodarkening filters such as electrically controlled liquid crystal devices have been incorporated into windows. These have the drawback of requiring continuous power to operate, and requiring substantial infrastructure (wiring, switches, sensors, control systems, etc.) as part of their installation. Furthermore, such devices are based on, and use the same basic technology as, LCD video displays. In essence an electrodarkening window filter is a black and white video display with a single gigantic pixel. The liquid crystal in LCD video displays is designed to have a very high "clearing point" (the temperature at which the LC changes phase and becomes an uncontrolled, disorganized, isotropic liquid), to prevent the display from going black under normal operating temperature and light levels. The goal of display design for many years has been to develop liquid crystal formulations that meet other critical design goals such as switching speed with clearing points that are as high as possible to allow the display to run at higher temperatures without this failure mode, and electrodarkening window filters that incorporate commercially available LC mixtures share this trait.

The information included in this Background section of the specification, including any references cited herein and any description or discussion thereof, is included for technical reference purposes only and is not to be regarded as subject matter by which the scope of the invention is to be bound.

SUMMARY

In one implementation of the disclosed technology, a thermally switchable device is described that regulates the transmission and absorption of light and radiant energy. The device may include two absorptive polarizers and a thermotropic depolarizer positioned between the two polarizers. At a first temperature, the device may absorb a first percentage of the incident radiant energy and may transmit a second percentage of the incident radiant energy through the device. At a second temperature, the device may absorb a third percentage of the incident radiant energy and may transmit a fourth percentage of the incident radiant energy through the device. Additionally, when the switchable device is above a threshold temperature up to 100% of incident light may be absorbed by the device, while below the threshold temperature up to 50% of incident light may be absorbed by the device. The thermotropic depolarizer may adjust the polarization of incident light when it is below a threshold temperature. Furthermore, one or more of the absorptive polarizers may be frequency selective with respect to polarization of the radiant energy.

In one exemplary embodiment, the first polarizer and the second polarizer may each define transparent areas and may allow transmission of unpolarized radiant energy through the device. The switchable device may also include an electrotropic control system to supplement and actuate the thermotropic depolarizer at the threshold temperature. The electrotropic control system may include at least a controller, a power supply connected with the controller and a temperature sensor connected with the controller.

Another embodiment of the present invention may take the form of an insulating glass unit. The insulating glass unit may include a first plate of glass and a second plate of glass. The insulating glass unit may also include a first polarizer positioned between the first plate of glass and the second plate of glass. The first polarizer may absorb up to 50% of incident radiant energy and may transmit a majority of non-absorbed radiant energy. Additionally, the insulating glass unit may include a second polarizer positioned between the first plate of glass and the second plate of glass and a thermotropic depolarizer that may be positioned between the first polarizer and the second polarizer. The thermotropic depolarizer may adjust the polarization of incident light below a threshold temperature. Above the threshold temperature up to 100% of incident light may be absorbed by the device and below the threshold temperature up to 50% of incident light may be absorbed by the device. Further, the second polarizer may absorb up to 100% of radiant energy transmitted by the first polarizer when the thermotropic depolarizer is above the threshold temperature and may transmit up to 100% of radiant energy transmitted by the first polarizer when the thermotropic polarizer is below the threshold temperature.

In yet another embodiment, a method for regulating absorption and transmission of incident radiant energy using a thermally switched absorptive optical shutter (TSAOS) device is disclosed. The device may include a first absorptive polarizer, a second absorptive polarizer, and a thermotropic depolarizer located between the first polarizer and the second polarizer, in which the first polarizer and the second polarizer may be oriented crosswise with respect to one another. The device may be located so that radiant energy is incident upon it and may absorb a first percentage of the radiant energy from the device and may transmit a second percentage of the radiant energy through the device at a first temperature. Additionally, the device may absorb a third percentage of the radiant energy from the device and may transmit a fourth percentage of the radiant energy through the device at a second temperature. Moreover, when the first temperature is above a threshold temperature, in the first absorbing operation, the first polarizer and the second polarizer may absorb up to 100% of radiant energy. Alternatively, when the second temperature is below the threshold temperature, a portion of the radiant energy transmitted between the first polarizer and the second polarizer may be depolarized. In this state, the device may transmit up to 50% of the radiant energy and may absorb up to 50% of the radiant energy.

Still another embodiment is a method for regulating reflection and transmission of radiant energy. An absorptive polarizer may be oriented crosswise with a polarity-rotating polarizer and a thermotropic depolarizer may be interposed between the polarizer and the polarity-rotating polarizer. The absorptive polarizer and the polarity-rotating polarizer may absorb up to 100% of incident radiant energy when the thermotropic depolarizer is above a threshold temperature and when below a threshold temperature, up to 100% of the incident radiant energy may be transmitted through the absorptive polarizer, thermotropic depolarizer, and the polarity-rotating polarizer.

Other features, details, utilities, and advantages will be apparent from the following more particular written description of various embodiments of the shutter device as further illustrated in the accompanying drawings and defined in the appended claims.

DETAILED DESCRIPTION

Figure 1:
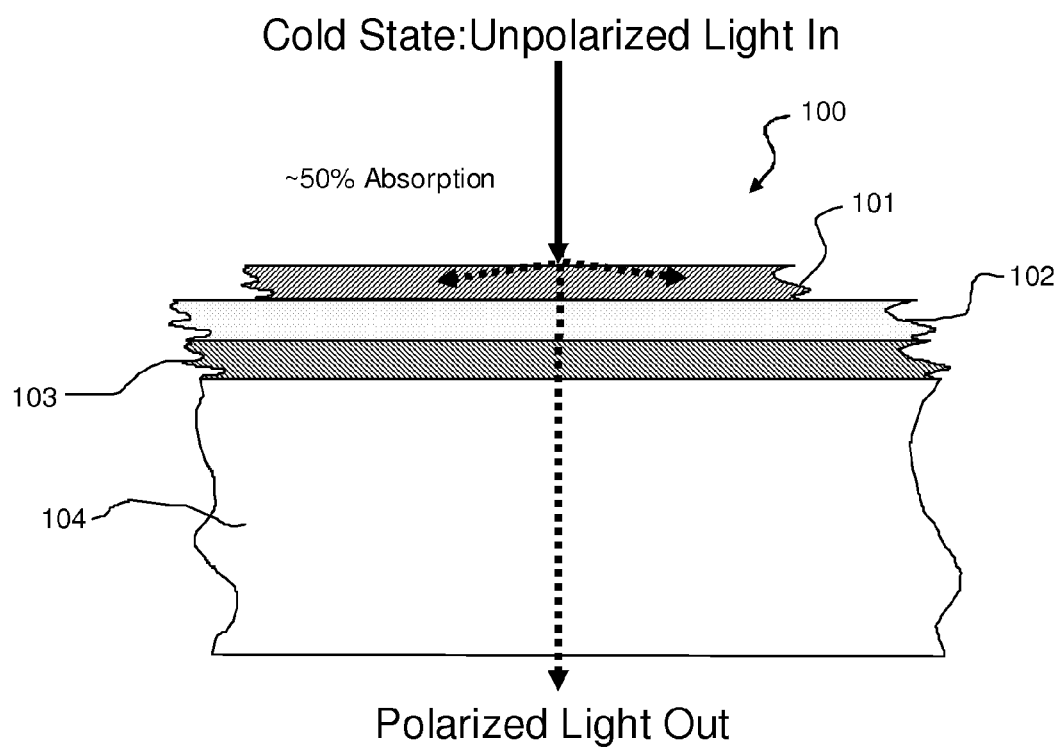
FIG. 1 is a schematic, cross-section view of one embodiment of a thermally switched absorptive shutter device depicting a layer of thermally sensitive depolarizer material sandwiched between two absorptive polarizing filters and attached to a transparent substrate. The action of incoming light is depicted for a cold state of the shutter device.

The technology disclosed herein is directed to the temperature-based control over the transmissivity of a window or similar material or structure with regard to radiant energy (e.g., visible, UV, infrared light and so on), potentially including the entire range of the solar spectrum, for the purpose of regulating the flow of heat into a structure based on external weather conditions, internal temperature, or any combination of the two. This technology may be used as a building or construction material to regulate the flow of radiant energy (including visible, UV, and IR light) through windows, skylights, and other transparent materials based on temperature, thereby restricting the admission of radiant energy (e.g., sunlight) at high temperatures. Thus, this technology can be used to regulate the internal temperatures of buildings and other structures by controlling the amount of solar radiation they absorb.

This technology may be employed as a device having a temperature-responsive optical depolarizer, for example, a thermotropic liquid crystal sandwiched between two absorptive polarizing filters to regulate the passage of light energy. The incident energies passing through this device may depend on the absorption efficiencies of the polarizers used. For example, for polarizers that are very efficient at absorbing radiant energy over the frequency bandwidths of interest, up to half of the incident radiant energy passes through the device when it is below a threshold temperature (e.g., the liquid crystal's clearing point) and up to 100% of the incident radiant energy may be absorbed by the device above the threshold temperature, yielding a thermally switched absorptive optical shutter (hereinafter "TSAOS" or "shutter").

Lower efficiency polarizers, or polarizers with frequency-dependent efficiencies, may be used to affect percentages of absorption above and below the threshold temperatures that are desirable for aesthetics, energy management, or other reasons. This effect can also be reversed such that the TSAOS device may be absorptive in its cold state, or expanded such that the transmissivity of the TSAOS device may be higher in the transparent state, or retarded such that the absorptivity of the TSAOS device may be lower in the absorptive state. The effect may be reversed for reasons of aesthetics or energy management, or for other reasons.

Electrodarkening materials have also been used to regulate the transmission of light. The most widely used electrodarkening material is a liquid crystal sandwiched between two highly efficient absorbing polarizers, which attenuate slightly more than 50% of the light passing through them, primarily by absorption. This light transmission of this material is controlled by an electric field created by coatings of a transparent, electrically conductive material such as indium-tin-oxide (ITO). These liquid crystal panels are typically used in video displays have seen only very limited use in building materials. This is, in part, because of the significant infrastructure required to utilize them, including electrical wiring and power sources, and the requirement of either sophisticated control systems, sensors, and algorithms, or extensive user inputs, to set the state of the materials and thus regulate the light, heat, and radiant energy through them. In the prior art, the use of liquid crystal devices as window shutters is limited to electrically operated, (i.e., electrodarkening) panels.

Additionally, thermal switches may allow the passage of heat energy in their ON or closed state, but prevent it in their OFF or open state. These switches may be mechanical relays, which rely on contact between two conducting surfaces (typically made of metal) to enable the passage of heat. When the two surfaces are withdrawn, heat energy may be unable to conduct between them except through the air gap. If the device is placed in vacuum, heat conduction may be prevented in the open state. Another type of thermal switch may involve pumping a gas or liquid into or out of a chamber. When the chamber is full, it may conduct heat. When empty, there may be no conduction, although radiative transfer across the chamber may still occur.

Since light that is absorbed becomes heat, optical switches may also be thermal switches for purposes of controlling solar heat gain. Light can be blocked by optical filters which may absorb or reflect certain frequencies of light while allowing others to pass through, thus acting like an optical switch. Also, the addition of a mechanical shutter can turn an otherwise transparent material, including a filter, into an optical switch. In one example, when the shutter is open, light may pass through easily and when the shutter is closed, no light may pass through the shutter. If the mechanical shutter is replaced with an electrodarkening material such as a liquid crystal pixel, then the switch is "nearly solid state," with no moving parts except photons, electrons, and the liquid crystal molecules themselves. Other electrodarkening materials, described for example in U.S. Pat. No. 7,099,062 to Azens, et al., can serve a similar function. These optical filter/switch combinations are not passive, but must be operated by external electrical signals Thermodarkening materials may change color and may increase the amount of light absorbed by the material as the temperature of the material increases or decreases past a predetermined value. Down-conversion of light creates heat, and thus the temperature of thermoabsorptive materials may be increased during absorption depending on the temperature environment of the material. However, this effect may be advantageous in many applications, and negligible in effect in others. Twisted nematic liquid crystal displays utilizing absorptive polarizers, for example, turn completely black if raised above their "clearing point" temperature because, in the liquefied (isotropic) state, the disorganized liquid crystal molecules are unable to affect the polarization of light passing through them. If the display uses crossed polarizers, then approximately 50% of the incoming light may be absorbed at the first polarizer and the other 50% at the second polarizer, resulting in nearly 100% opacity. However, if the polarizers are oriented less than 90 degrees apart or if a third polarizer is placed between them at an offset angle, then the liquid crystal display may not be completely opaque above its clearing point.

Absorptive polarizers take many forms, and can absorb light of a given linear or circular polarization. Certain crystals absorb more of one polarization of light than another. Polaroid film, a common absorptive polarizer, has been manufactured using an arrangement of such crystals. It has also been manufactured using polyvinyl alcohol (PVA) plastic doped with iodine. The plastic is stretched to align the polymer chains preferentially in one direction. Light polarized parallel to the chains is absorbed, and light polarized parallel to the chains is transmitted. In addition, absorptive polarizers can be made from certain types of liquid crystals. Absorptive liquid crystal polarizers (LCPs) can be linearly or circularly polarizing. Thus, light of one helicity (i.e., right- or left-handed) is transmitted and light of the opposite helicity is absorbed.

For the purposes of this document, the term "thermoabsorptive" is used herein to describe a device or material with variable absorptivity that varies with or is directly controlled by temperature. The term "radiant energy" is used to refer to visible light, infrared, ultraviolet, and other wavelengths that obey the laws of optics. The term "optical" as used herein refers to any effect of a material or device on radiant energy, for example, absorption, reflection, transmission, polarization, depolarization, or diffusion.

For the purposes of this document, the term "thermotropic depolarizer" means a material in which the depolarization, e.g., rotation of polarization, varies with or is directly controlled by temperature. One exemplary way to construct a thermotropic depolarizer is to hold thermotropic liquid crystal between two alignment layers. The orientations of the thermotropic liquid crystal molecules are influenced both by the alignment layers, e.g., their chemistry and structure, and the temperature or temperature gradient. In a thermotropic liquid crystal with a nematic state this structure may be utilized as a waveblock where the rotation of polarization of various frequencies and bandwidths of light are temperature dependent, and where the crystal-like structure of the waveblock collapses above a threshold temperature. This discussion of thermotropic liquid crystals is provided as an example and should not be considered as limiting the scope of the TSAOS device.

For the purposes of this document, the term "low clearing point" means a clearing point which has been selected such that in normal operation of the device, the functional transition between operating states (e.g., between nematic and isotropic states, or between other ordered states and isotropic in a liquid crystal) may occur as part of the normal operation of the device and which falls somewhere within the normal range of operating temperatures for the device. This differentiates low clearing point formulations from the high clearing point formulations used in displays, which are set high enough such that the transitions between operating states may never occur in normal operation of the display and which fall outside the normal range of operating temperatures for the device. One example of a low clearing point device may be a thermoabsorptive window shutter with a clearing point set below the highest temperature experienced by shaded windows in common usage, approximately 85 degrees Celsius, which is well below the high clearing point normally used in displays. In another example, a window film or outdoor video display (e.g., a gas pump meter) subjected to full sunlight on a summer day in a hot-climate region could reach temperatures of 85 C. Therefore, a "low clearing point" device intended to withstand these conditions would have a clearing point below 85 C., whereas a "high clearing point" device would have a clearing point above 85 C.

For the purposes of this document, the term "switch" includes, but is not limited to, solid-state, electrical, optical, and mechanical devices, for selectively blocking or permitting the flow of energy, and includes both digital switches (e.g., transistors and relays) and analog regulators (e.g., tubes and rheostats). Furthermore, a valve for selectively blocking or regulating the flow of gases or fluids can be considered analogous to a switch so that, in principle, the two terms can be used interchangeably. By this definition, the TSAOS device may be a solid-state optical switch, which moves from its "open" or transmissive state to its "closed" or absorptive state based on the temperature of the TSAOS device.

For the purposes of this document, the term "passive" refers to an object or device that may respond to environmental conditions but may operate independently of external signals or instructions from an operator. Thus, a device may include a number of complex components, including moving parts, and still be regarded as a passive device in the discussions herein. Similarly, although a user override mode may be included in the device, it may not alter, in any essential way, the passive nature of such a device. By contrast, an active device may be one that requires user input in order to perform its normal functions. As an example of these definitions, light-sensitive sunglasses may be a passive device, whereas a standard light bulb operated by a wall switch or dimmer switch may be an active device.

For the purposes of this document, the term "depolarizer" refers to an object, device, or substance that rotates or otherwise alters the polarization vector of light passing through it in some way other than attenuation. Separately, the term "polarizer" refers to an object, device, or substance that blocks light of one polarity while transmitting light of orthogonal polarity or, in the case of circularly polarized light, of opposite helicity. Most typically, this blocking occurs by absorption.

It should also be understood that some reflection may occur in absorptive polarizers just as some absorption occurs in reflective polarizers, but that the two types may rely on different operating principles and produce qualitatively different optical effects. When discussing absorptive polarizers, it is convenient to assume for purposes of discussion that they are 100% efficient (or approximately 100% efficiency) in absorbing light of one polarity and transmitting the other polarity of light. However, in actual practice, these polarizers may be less than 100% efficient (e.g., due to design choice or design and manufacturing limits), be partially reflective and have frequency-dependent and spatially dependent reflection, absorption, and transmission characteristics (e.g., due to design choice or design and manufacturing limits) or any combination thereof, and this should not be construed as limiting the scope of the invention.

Generally, one embodiment of the present invention may take the form of a thermotropic optical depolarizer which may be used in conjunction with two transparent polarizers to create a thermally switched absorptive optical shutter. The TSAOS device may allow light and radiant energy to pass through at low temperatures and may absorb such light and radiant energy at high temperatures. The depolarizer may be selected or designed such that its polarization state shifts at a predetermined temperature (e.g., the depolarizer may be thermotropic, thus shifting the polarization state at a predetermined temperature). The TSAOS device also may be used in applications for regulating the temperatures of buildings, vehicles, or other structures by controlling the amount of solar radiation they absorb.

In one implementation of a TSAOS device, two absorptive polarizing filters, which may transmit light of a polarization parallel to their own and may absorb light of a perpendicular polarization, may be arranged in succession. When the absorptive polarizers are oriented in parallel, up to 50% of the incoming radiant energy may be absorbed. When the absorptive polarizers are oriented perpendicular to one another, up to 50% of the light may be blocked at one polarizer and up to the remaining 50% transmitted by the first absorptive polarizer may be blocked by the second absorptive polarizer. In this case, transmission of light through both absorptive polarizers may be very small (often less than 1%) and the majority of the light (often close to 100%) may be absorbed.

One embodiment of a TSAOS device includes two absorptive polarizing filters which may transmit light of a polarization parallel to their own, and may absorb light of a perpendicular polarization. Thus, approximately 50% of the incoming light may be absorbed. In practice, a small additional amount may also be absorbed, thus the light transmission through two parallel polarizers may be 30-40%. When the polarizers are oriented perpendicular to one another, approximately 50% of the light may be blocked at one polarizer and approximately 50% may be blocked at the other. In this case, transmission of light through both filters may be less than 1%, and the majority of the light (close to 100%) may be absorbed.

In another implementation, a switchable depolarizer, which may change the polarization of the light passing through it, may be configured in conjunction with two or more absorptive polarizers. In one embodiment of this implementation, the switchable polarizer may be a liquid crystal sandwiched between two sheets of transparent, microtextured material such as polymer-coated glass or polymer films. The switchable depolarizer may be specifically selected or designed to be thermotropic, so that its polarization state shifts at a predetermined temperature. In the "off" state, the polarization state of incoming light may be largely unaffected by the depolarizer, and in the "on" state, light of a particular polarization, having passed through the first polarizer, may be rotated by a set amount. This is typically done to align the light with the second polarizer, either in a parallel or perpendicular state depending on the desired optical effect. Thus, the combination of two absorptive polarizing filters and a liquid crystal (e.g., a thermotropic liquid crystal with a nematic state) may form a switchable absorber that absorbs either up to 50% or up to 100% of the incoming light, depending on the state of the liquid crystal. Thus, the combination of two absorptive polarizing filters and a liquid crystal may form a switchable absorber that absorbs either up to 50% or up to 100% of the incoming light, depending on the state (and therefore the temperature) of the liquid crystal. Such a thermoabsorptive shutter may use a liquid crystal or liquid crystal formulation with a designed operating range between about −30 degrees Celsius and 60 degrees Celsius, which may correspond to typical temperatures tolerated by humans, and/or a designed clearing point suitable for outdoor surface temperatures of human habitats, for example, greater than about −40 degrees Celsius and less than about 85 degrees Celsius).

Many materials exhibit thermotropic properties, including liquid crystals, which transition from an ordered or "ON" state (e.g., crystalline, nematic, or smectic) to a disordered or "OFF" state (e.g., liquid, isoptropic, or non-polarizing) at a temperature referred to herein as the "clearing point." For example, 4-butylcyanobiphenyl (CB) liquid crystals may have a clearing point of approximately 16.5 degrees centigrade, while 6CB liquid crystals may have a clearing point of approximately 29.0 degrees centigrade, and thus "melt" (i.e., become isotropic) under conditions close to room temperature. Mixtures of 4CB and 6CB may have a clearing point between these two values, in direct approximately linear, proportion to the percentage of each component in the mixture. In the "OFF" state, the polarization state of incoming light may be largely unaffected by the depolarizer, and in the "ON" state, light of a particular polarization, having passed through the first polarizer, may be rotated by a set amount (e.g., 45 or 90 degrees, but also 180 or 270 degrees, or other values not divisible by 45).

In some implementations, the TSAOS device may be in a cold (e.g., crystalline, nematic, or smectic) state and absorb up to 50% of the light or other radiant energy that strikes it, and transmit approximately 40%. In a hot (e.g., isotropic) state, the TSAOS device may absorb up to 100% of the incoming light. Thus, the TSAOS device may form a thermally switched, absorptive optical shutter. The opposite transition, a shutter that may be absorptive when cold and transmissive when hot, is also possible, and may depend on the exact arrangement of the polarizer and depolarizer layers.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

FIG. 1 is a schematic, cross-section view of one embodiment of a TSAOS device 100. As shown in FIG. 1, a thermotropic depolarizer layer 102 may be located between two absorptive polarizing filters 101 and 103 and may be attached to an optional transparent substrate 104. In a general case, the external light source may be unpolarized white light (i.e., light with significant intensity across a significant bandwidth of the visible, near-UV, and near-IR spectrum). In one use of the TSAOS device 100, the external light source may be the sun. However, the shutter device may also function when the external light source is not white light as, for example, the diffuse radiant energy of the blue sky.

In one embodiment, the incoming light may first pass through the outer absorptive polarizer 101. Forms of the polarizer may include Polaroid™ film or may be an absorptive liquid crystal polarizer (LCP) although other forms may also be used.

Of the incoming light, approximately 50% may have polarization perpendicular to that of the outer absorptive polarizer 101 and may be absorbed by the outer absorptive polarizer 101. Of the remaining light with polarization parallel to that of the outer absorptive polarizer 101, some percentage may be absorbed by the thermotropic depolarizer 102 and/or through off-axis absorption by the outer absorptive polarizer 101, and the remainder may be transmitted through.

Once the incoming light has passed through the outer absorptive polarizing filter 101, the incoming light (e.g., sunlight) may enter the thermotropic depolarizer 102, which may be a device or material capable of exhibiting two different polarizing states. In its hot (e.g., isotropic or liquid) state, the polarized light passing through the thermotropic depolarizer 102 may not be affected. In its cold (e.g., nematic or crystalline) state, the thermotropic depolarizer 102 may rotate the polarization vector of the incoming light by a fixed amount. In one embodiment, the thermotropic depolarizer 102 may be a twisted nematic liquid crystal that may rotate the polarization vector of light by 90 degrees. However, a variety of other devices and materials may be used, including nematic liquid crystals which may be oriented at 45 degrees to the outer absorptive polarizer 101.

Once the light has passed through the thermotropic depolarizer 102, the remaining polarized light may strike the inner absorptive polarizer 103, also known as the "analyzer," where the light may be either absorbed or transmitted, depending on the polarization state. The inner absorptive polarizer 103 may be oriented such that its polarization is perpendicular to that of the outer absorptive polarizer 101. Thus, in the hot state of the shutter device, when the polarization vector of the light may not be rotated, the polarity of the light may be perpendicular to that of the inner absorptive polarizer 103 and approximately 100% of it may be absorbed. However, in a cold state, when the polarization vector of the light may not be rotated by 90 degrees and may be parallel to the inner absorptive polarizer 103, a small amount of the light may be absorbed by the inner absorptive polarizer material and the rest may be transmitted through.

The action of incoming light in FIG. 1 is depicted for the cold state in which the outer absorptive polarizer 101 may absorb up to 50% of the incoming light. The remaining light may pass through the thermotropic depolarizer 102 where the polarization vector of the light may be rotated and then the light may pass through the inner absorptive polarizer 103 or analyzer where the light may be largely unaffected. The light may then pass through an optional transparent substrate 104 and finally exit the TSAOS device 100. Thus, in its cold state the shutter device 100 may serve as an attenuator that may absorb approximately 50% of the light striking its outer surface, may reflect a small amount of light, and may transmit the rest of the light through to the inner surface.

Figure 2:
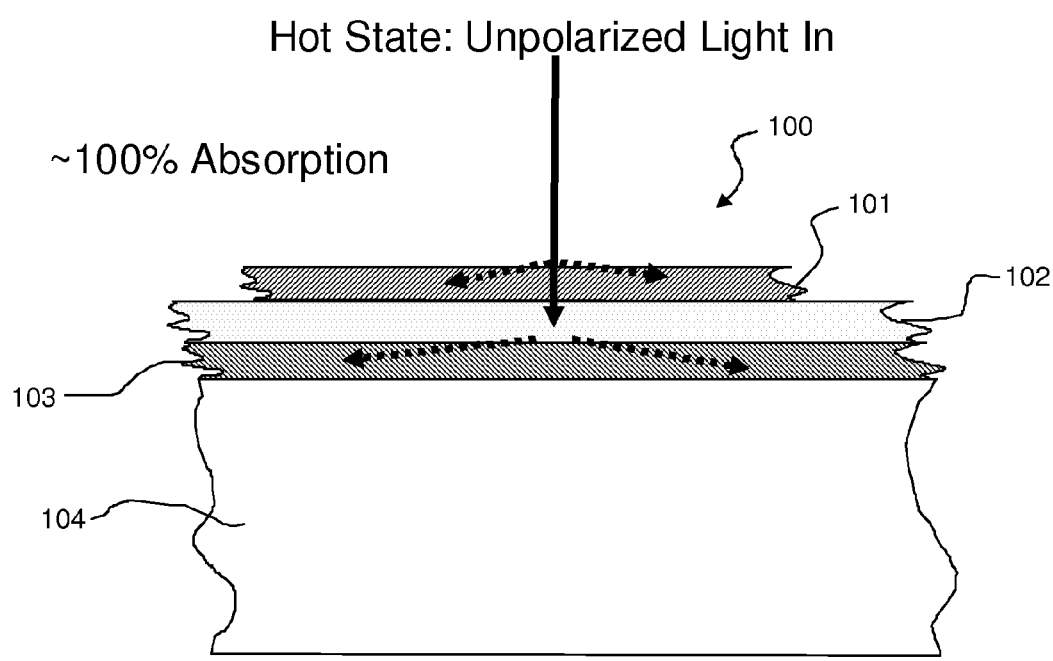
FIG. 2 is a schematic, cross-section view of the embodiment of the shutter device of FIG. 1, except that the action of incoming light is depicted for the hot state of the shutter device.

FIG. 2 is a schematic, cross-section view of the same embodiment as FIG. 1, except that the action of incoming light is depicted for the hot state of the TSAOS device 100. The thermotropic depolarizer 102 may not affect the polarization vector of the light passing through it. Thus, any light striking the inner absorptive polarizer 103 may be of perpendicular polarity to it, and approximately 100% may be absorbed. The TSAOS device 100 may therefore serve as a shade that may absorb approximately 100% of the light striking its outer surface.

Accordingly, in its cold state the TSAOS device 100 may transmit slightly less than half the light energy which strikes its outer surface, whereas in the hot state the TSAOS device 100 may transmit less than 1% of the light energy. As a result, the TSAOS device 100 can be used to regulate the flow of light or radiant heat into a structure based on the temperature of the TSAOS device 100.

In this embodiment, the transparent substrate 104 may be present for reasons of structural support and convenience. The transparent substrate 104 may be deleted without significantly altering the function of the TSAOS device 100. Alternatively, the transparent substrate 104 may be placed on the outer surface of the TSAOS device 100 rather than the inner surface, or transparent substrates 104 may be placed on both surfaces, inserted between one or more of the functional layers of the TSAOS device 100, or any combination thereof, without significantly altering its function. Furthermore, the transparent substrate 104 may be located on the inside surface of the shutter device 100 as shown in FIGS. 1 and 2, and it need not be transparent to all wavelengths. Additionally, the transparent substrate 104 may be a longpass, shortpass, or bandpass filter as long as the transmitted wavelengths are useful as heat energy, illumination, or for some other purpose. However, for convenience and cost it may generally be preferable to use an ordinary transparent material such as glass or acrylic as the substrate.

Generally, the eye works on a logarithmic scale. Thus it may be likely that a 50% attenuation of incoming light may appear, subjectively, to be approximately 84% as bright as the original, unattenuated light, although it could be greater or lesser than this depending upon particular conditions or circumstances. As a balance of aesthetic, human, and energy management factors, preliminary evidence indicates that a hot state transmission of approximately 10-20% of incident solar energy and a cold state transmission of 50-70% of incident solar energy may be desirable for window applications. However, different transmission levels may be desirable for different uses and embodiments of the TSAOS device.

In one exemplary process for fabricating a TSAOS device, the first step may be to create the liquid crystal (LC) cell or "bottle". Two sheets of $SiO_2$-coated (passivated) glass may be scribed to a pre-determined size and placed in substrate holders. If there is an indium tin oxide (ITO) low emissivity coating on the glass, it may be etched off, leaving the $SiO_2$ in place. The sheets may then be placed in a 48 KHz ultrasonic cleaner (e.g., Crest Truesweep set at power level 8) for 15 minutes, using a pH neutral soap mixed at one ounce per gallon of deionized (DI) water (28 Ohm purity or better). If there are polyimide (PI) wetting issues, then the sheets may be rewashed with Detrex soap. Larger sheets may be cleaned instead using a commercial glass washer (e.g., Billco Series 600). The sheets may be dried with isopropyl alcohol (IPA) and placed in a drying oven at 80-85 degrees Celsius for approximately 120 minutes or longer as needed for moisture-free storage and staging, and may then be placed in an ozone cleaner for approximately 15 minutes. A PI alignment layer, dissolved in a solvent, may then be deposited by spin coating at 500 RPM for 10 seconds followed by 2000 RPM for 45 seconds. Consistent coating requires approximately 1 ml per square inch of sheet. For sheets too large to spin coat, the PI solution may be deposited by an inkjet printer. After coating, the substrates may be heated at 85 degrees Celsius for approximately five minutes to flash away any remaining solvent, and then may be baked at 180-190 degrees Celsius for approximately one hour to harden the PI. The oven door should not be opened until the inside temperature is 85 degrees Celsius or lower.

To prevent contamination of the PI surface, the sheets may then be stored in a vacuum oven at 50 degrees Celsius until needed. The sheets may then be placed in a vacuum fixture to hold them in place, and rubbed with a block of polypropylene or aluminum wrapped with rub cloth material secured with a double-sided tape. The rub block may be pushed across the surface 25 times in the same direction with no downward pressure other than its own weight. The rub direction may then be marked (e.g., with a Sharpie pen) on the uncoated side of the sheets. A plurality of 7.5-micron spacer beads may then be applied to the rubbed surface of one sheet with an air puff machine, and a second sheet, with rub direction oriented at 90 degrees from the first substrate, may be placed rubbed-side-down atop the first sheet. The edges may be sealed first with an optical adhesive (e.g., Norlin 68), which may not interact with the liquid crystal, and then with a waterproof sealer (e.g., Loctite 349) leaving at least two ports open, each approximately 1 cm wide. The Norlin 68 may be UV cured with a dose of at least 4000 $mJ/cm^2$ and either baked for 12 hours at 50 C. or else allowed to cure at room temperature for a full week.

The bottle (two sheets with partially sealed edges) may then be placed in a vacuum loader with a pressure of 20 milliTorr or less and at a temperature below the clearing point and above the freezing of the liquid crystal, and lowered into a slot containing the liquid crystal (e.g., a mixture of 5 parts 6CB, 1.25 parts E7 and 0.008 parts 811 with a clearing point of 35 C). The liquid crystal may be drawn into the bottle by capillary action. When loading is complete, the bottle may be removed from the vacuum chamber, the ports may be sealed with Norlin 68 and Loctite 349, and the curing step may be repeated, taking care to avoid unnecessary exposure of the liquid crystal mixture to UV light. Once a bottle is fabricated, it can then be further constructed into a finished TSAOS device. Exemplary TSAOS devices may include a stand-alone, thermoabsorptive filter (e.g., an LC bottle, polarizers, and UV protection only) and an insulated glass unit (IGU) or "double-paned window" with the thermoabsorptive filter laminated to one pane. To fabricate a thermoabsorptive filter, the LC bottle may be laminated several times with layers of optically clear sheet adhesive (e.g., 3M 8141 and 3M 8142 optically clear adhesive), and absorptive polarizer films (e.g. Nitto Denko GU-1220DUN). A layer of UV shielding may then be applied (e.g., GamColor 1510 UV film). All lamination steps may be performed in a class 10,000 cleanroom environment with a class 1,000 downdraft hood to prevent particulates from causing air bubbles in any of the adhesive layers.

The process of constructing a TSAOS device from a bottle may begin by using a 6 ft automatic/manual roll laminator to apply adhesive to the bottle. Using preset increments on the leveling knobs, an elevation may be set on the laminator to avoid damaging the bottle. One layer of 3M 8141 may be applied to the bottle, followed by a layer of absorptive polarizer. The process may be repeated on the reverse side of the bottle, with the polarizer film at 90° rotation from the previous layer. One more layer of 3M 8141 may be applied to either side of the bottle, and then a layer of UV shielding may be applied as the last step. At this point, the bottle has become a thermoabsorptive filter.

Alternatively, a flexible bottle may be formed directly from the two polarizers. One method may include forming an alignment layer naturally from the draw and/or stretch directions of the polymer films or applied to them by means of rubbing as described above. In this case, the LC may be loaded through ports as described above, or may be coated onto the polarizer as a thin film (e.g., through a gravure process), or may be "slopped and glopped" onto the polarizer and rolled flat (e.g., with a laminating roller) once the second polarizer has been placed on top at a 90-degree angle to the first polarizer on the bottom. In either case, the edges of the bottle may then be sealed either by heat sealing (e.g., with a soldering iron at a high temperature such as 345 degrees centigrade), or with a vice and a heat gun at 540 degrees centigrade, or some other temperature which is above the melting temperature of the polarizing film and which may produce an acceptably flexible edge seal. The UV-blocking film may then be laminated to the bottle as described above.

In order to fabricate an insulating glass unit ("IGU") from the LC bottle, further lamination may be required. The thermoabsorptive filter may be given two consecutive layers of 3M 8142 over the UV shielding. Window glass (whether untreated, annealed, heat-strengthened, chemically strengthened, or tempered), typically larger than the bottle by 1-2 in, may then also be given two consecutive layers of 3M 8142. The layers on the tempered glass may be laminated with tape underneath the border to prevent the 3M 8142 from completely covering the glass. The adhesive backing may then be removed from both the LC bottle and the tempered glass pane. The adhesive sides of each may be placed together and then run through the laminator a final time, again set at an elevation that is suitable for lamination and prevents damaging the bottle. The assembly can now have a standard insulated glass unit built around it. Standard aluminum IGU spacers with desiccant may be used to separate the two panes of IGU glass and may be attached to the glass with PIB bonding beads and sealed around the edges with polyisobutylene (PIB) hot-melt sealant. The IGU is now ready for shipping and installation.

Figure 3:
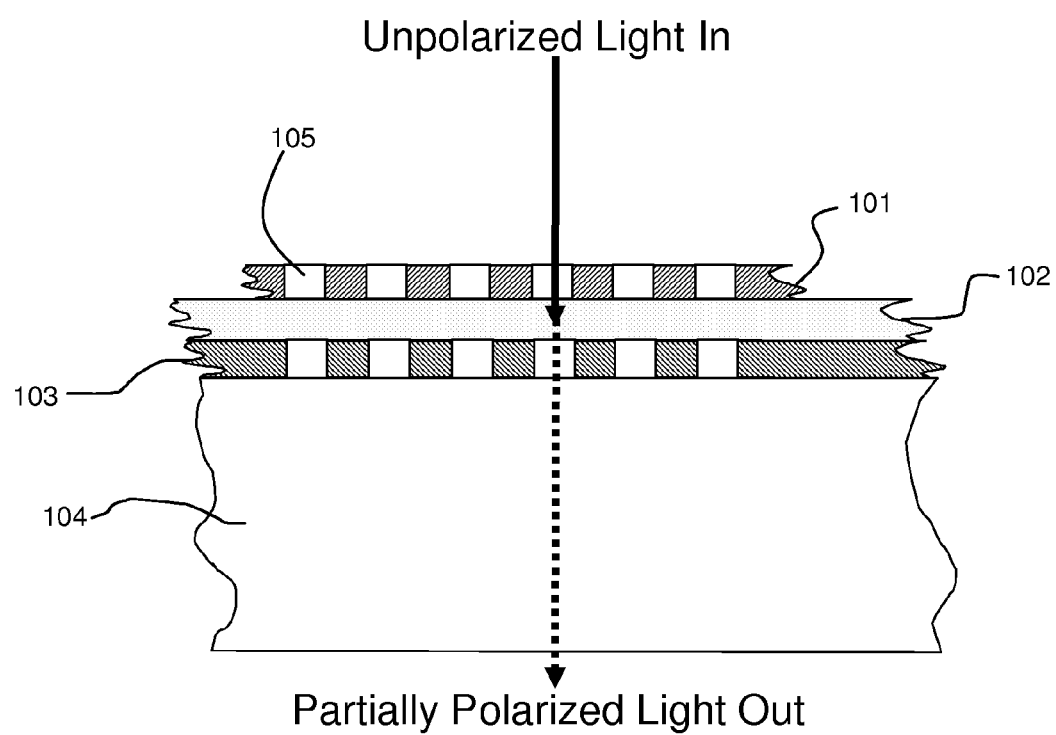
FIG. 3 is a schematic representation, in cross-section of another embodiment of a thermally switched absorptive shutter device, in which the absorptive polarizers define apertures or transparent areas to allow some unpolarized light from the external source to pass through the shutter device without modification.

FIG. 3 is a schematic representation of another embodiment of the TSAOS device in which there are gaps 105 in one or both absorptive polarizers 101 and 103 to allow some unpolarized light from the external source to pass through the shutter device without modification. These gaps 105 may take the form of holes or stripes, or alternatively the polarizer material itself may be applied in stripes or spots. However, a person of ordinary skill in the art will understand that there are numerous alternate methods for fashioning the gaps 105 that need not be elaborated here. This embodiment may be used, for example, in windows which offer a relatively clear view. In this case, the attenuation or obstruction of the absorptive polarizers 101 and 103 may be similar to looking through a normal window screen.

The use of absorptive polarizers 101 and 103 with gaps 105 in place of uniform polarizers may increase the transmission of energy through the shutter device under all conditions, and thus may reduce the ability of the device to reflect light and radiant energy in the hot state. However, this arrangement may be advantageous under circumstances where cold-state transparency is more important than hot-state absorptivity.

It may be noted that a similar effect can be achieved by rotating the two absorptive polarizers with respect to one another, to an angle greater than zero and less than 90 degrees, although this method may only increase transparency in the hot state of the shutter, and may (depending on the exact geometry of the shutter and the exact properties of the depolarizer) decrease transparency in the cold state. In the case that the polarizer is operating efficiently, the transparency in the cold state may not be greater than 50% (the state that occurs when two ideal polarizers are placed in parallel orientation). However, greater transparency may be achieved in the cold state, with a tradeoff of absorptivity in the hot state, if the polarization efficiency is less than 100%.

In an alternative embodiment, gaps in, or other alterations to, the liquid crystal or the alignment layer can produce an effect similar to having gaps in the polarizer, and that under some circumstances this may be easier or otherwise more desirable. Also, gaps 105 of any sort may be arranged so that only indirect light is able to pass through the shutter.

Figure 4:
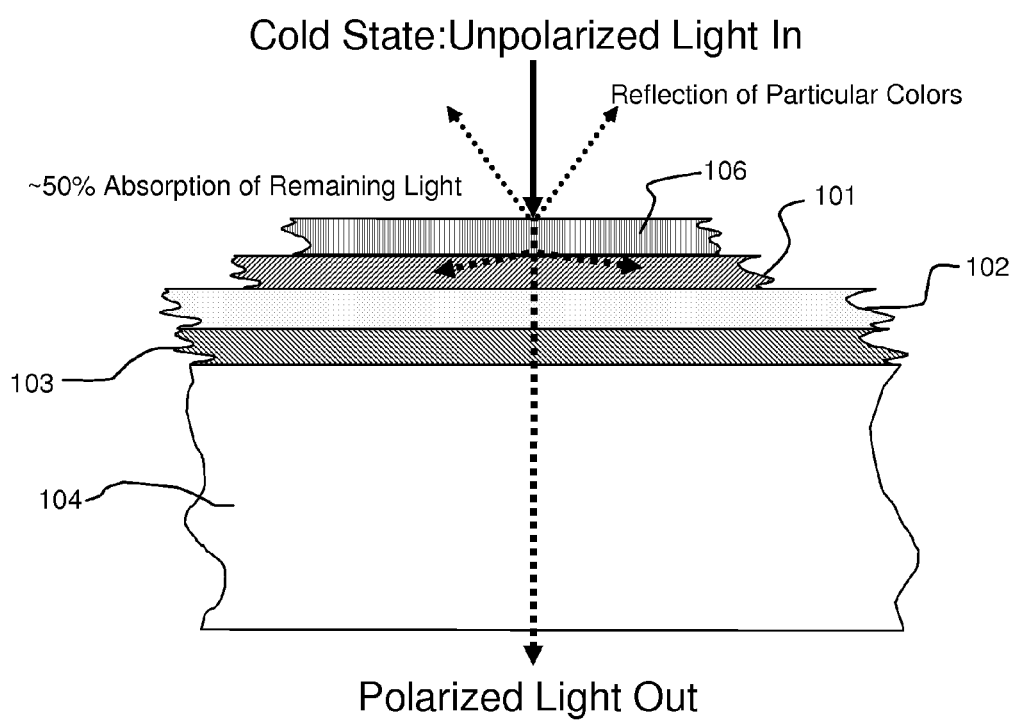
FIG. 4 is a schematic representation in cross-section of an additional embodiment of a thermally switched absorptive shutter device in which an optional color filter has been included for aesthetic or other reasons.

FIG. 4 is a schematic representation in cross-section of an additional embodiment of a TSAOS device in which an optional color filter 106 has been added. Other forms of the color filter 106 may include a band reflector (such as a distributed Bragg reflector (DBR) or rugate filter), which may be designed to reflect a narrow range of wavelengths and transmit all others, or a bandpass filter (e.g., a sheet of colored glass or plastic), which may be designed to transmit a range of wavelengths and reflect or absorb all others.

In FIG. 4, the color filter 106 is depicted as being on the exterior surface of the shutter device. However, a person of ordinary skill in the art will understand that different aesthetic or optical effects may be created by placing the color filter 106 behind other layers in the shutter device. For example, by placing the color filter 106 on the inner surface of the shutter device, the color may not be apparent to an exterior observer when the shutter device is in its hot, or 100% absorptive state.

The use of a color filter may reduce the amount of light and radiant energy transmitted through the shutter device in its cold, or 50% absorptive state. However, this arrangement may be advantageous under circumstances where aesthetics, rejection of key wavelengths, or hot-state absorptivity are more important than cold-state transparency.

Alternatively, instead of an additional color filter layer, the shutter device can be used with one or more colored polarizers (i.e., one which does not absorb or reflect across the entire visible spectrum) in place of one of the absorptive polarizers. One exemplary colored polarizer may be the Nitto Denko G1220DUN polarizing film, which yields a green color in the hot or absorptive state.

Figure 5:
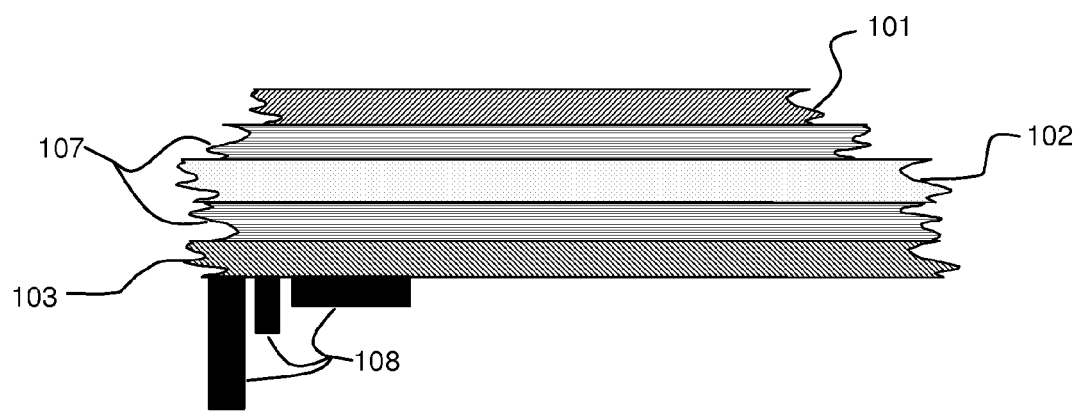
FIG. 5 is a schematic representation of a further embodiment of a thermally switched absorptive shutter device, in which the thermotropic depolarizer has been replaced with, or additionally serves as, an electrotropic depolarizer, through the addition of two transparent electrodes and a control system.

FIG. 5 is a schematic representation of a further embodiment of a TSAOS device, in which the thermotropic depolarizer 102 has been supplemented with an electrically-driven control system 108 that operates on one or more actuators 107.

An exemplary form of the actuator 107 may be a thin layer of a transparent, conductive material such as tin oxide or indium tin oxide (ITO), which may be employed as a resistive heater to dissipate electrical energy as heat in order to raise the temperature of the thermotropic depolarizer 102. Another exemplary form of the actuator 107 is a piezoelectric material that expands or contracts when a voltage is applied, thus shrinking or expanding the volume of the thermotropic depolarizer 102 to encourage or inhibit certain phase changes or thermal expansion and contraction effects. A person of ordinary skill in the art may understand that other types of actuators may be used to affect or bias the thermotropic behavior of the depolarizer 102, without departing from the spirit of the present invention.

The control system 108 may include a temperature sensor, power supply, and controller hardware. An exemplary form of the control system 108 may be a thermostat and LCD controller including a thermocouple connected to a programmable microcontroller and powered by a small battery or photovoltaic cell. When the sensed temperature rises above or falls below a threshold value, the control system may apply an AC or DC voltage to the actuator or actuators 107, such that the polarization properties of the thermotropic depolarizer may be altered (e.g., by forcing or encouraging the reorientation of liquid crystal molecules). The operation and use of this embodiment are otherwise similar to operation and use of the embodiment shown in FIGS. 1 and 2.

Figure 6:
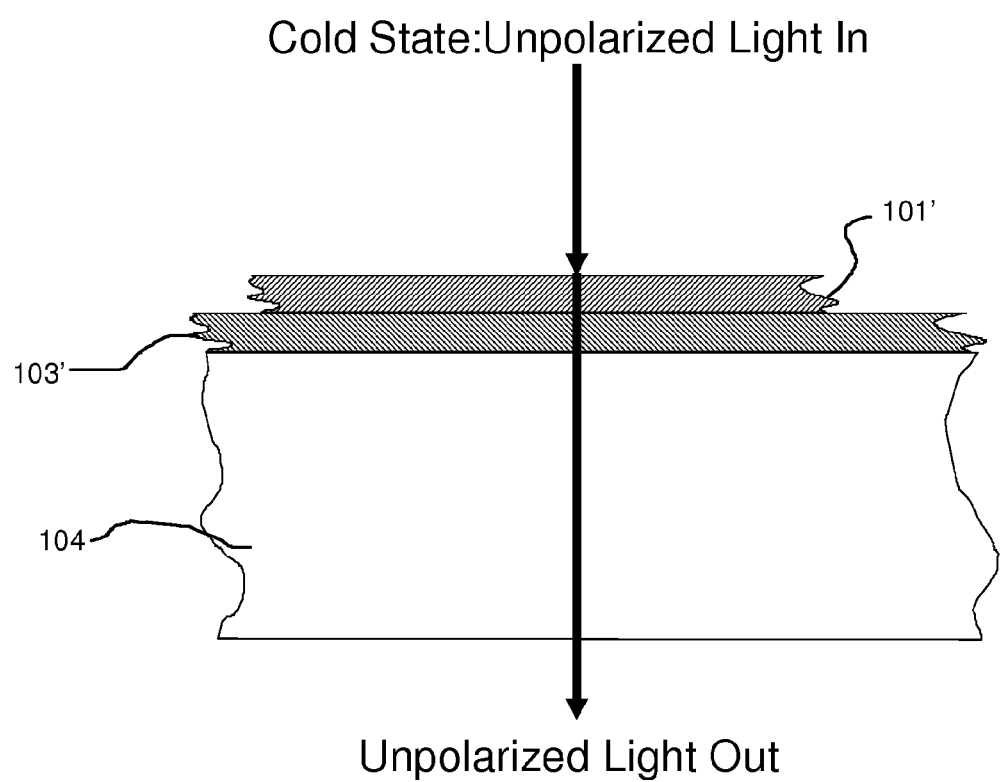
FIG. 6 is a schematic representation of an additional embodiment of a thermally switched absorptive shutter device, wherein the thermotropic depolarizer has been deleted, and the absorptive polarizers themselves are thermotropic. The action of incoming light is depicted for a cold state of the shutter device.

FIG. 6 is a schematic representation of an additional embodiment of a TSAOS device, wherein the thermotropic depolarizer 102 has been deleted, and one or both of the absorptive polarizers 101' and 103' are thermotropic. The design of the thermotropic absorptive polarizers 101' and 103' is such that they may polarize normally in the hot state, and may minimally polarize or may be nonpolarizing in the cold state. In one exemplary form, these polarizers consist of nanorods of absorptive "memory alloy" which align end-to-end in the hot state to form an absorptive polarizer and which align vertically in the cold state to form a nonpolarizing, minimally absorptive structure. Alternatively, the thermotropic polarizer may be a liquid crystal polarizer. Thus, in the cold state, unpolarized light entering the shutter may encounter the outer polarizer 101' in its nonpolarizing state, and the light may not be significantly affected by it, and then the light may encounter the inner thermotropic absorptive polarizer 103' in its nonpolarizing state, and the light may not be significantly affected by the inner thermotropic absorptive polarizer 103' either. Thus, except for some minor absorption, reflection, and scattering associated with transmission through the transparent substrate and the thermotropic absorptive polarizers 101' and 103' in their nonpolarizing state, essentially 100% of the incoming light may be transmitted through the shutter.

Figure 7:
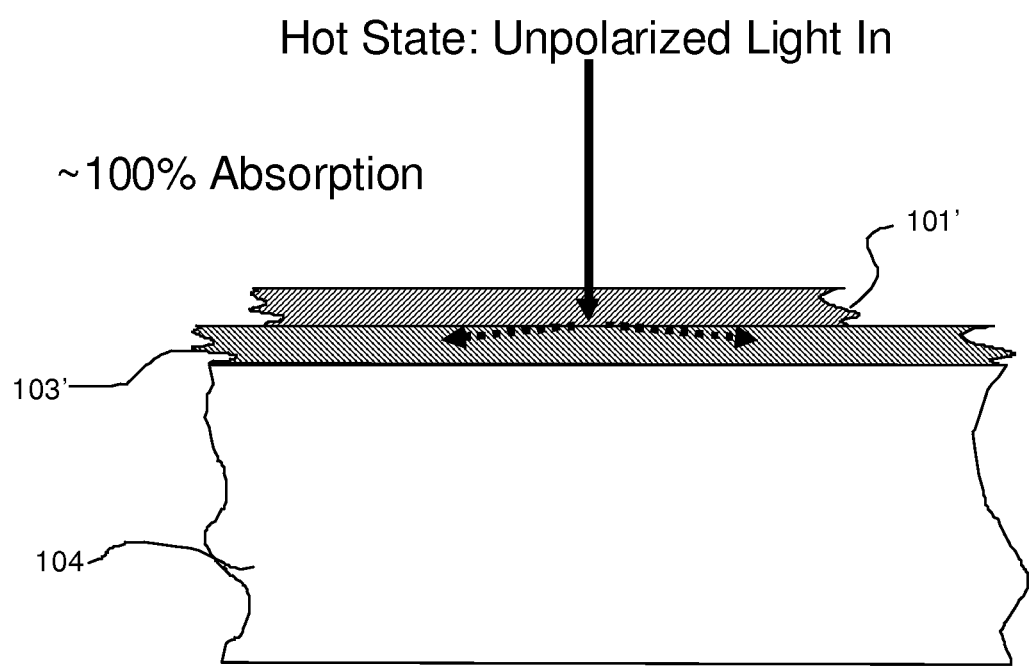
FIG. 7 is a schematic representation of the embodiment of FIG. 6, except that the action of incoming light is depicted for a hot state of the shutter device.

FIG. 7 is a schematic representation of the embodiment of FIG. 6 in a hot state. In this case both thermotropic absorptive polarizers 101' and 103' are in their fully polarizing configuration, with no depolarizer between them. Thus, when unpolarized light encounters the outer thermotropic absorptive polarizer 101', up to 50% of the light may be absorbed as in the other embodiments. The light that passes through is of opposite polarity, and therefore up to 100% of it may be absorbed by the inner thermotropic absorptive polarizer 103'. Thus, in its cold state the shutter may be up to 100% transmissive, and in its hot state the shutter is up to 100% absorptive. As in other embodiments, this ideal reflection may occur when the two thermotropic absorptive polarizers 101' and 103' are oriented approximately 90 degrees apart. The amount of transmission and reflection in the hot state may be adjusted by misaligning the two thermotropic absorptive polarizers 101' and 103', and the amount of transmission and absorption in the cold state can be adjusted by placing a depolarizer between the two thermotropic absorptive polarizers 101' and 103'.

Figure 8:
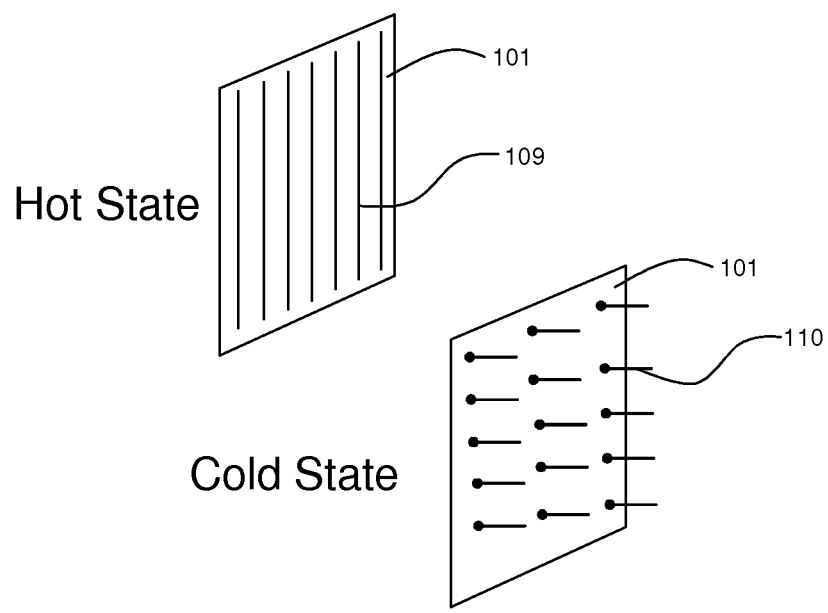
FIG. 8 is a schematic representation of an exemplary thermotropic absorptive polarizer in both the hot and cold states.

FIG. 8 is a schematic representation of an exemplary thermotropic absorptive polarizer 101, in both its hot and cold states. In this exemplary embodiment, the polarizer 101 is an absorptive polarizer which may be composed of parallel elements 109. The polarizer in this embodiment is a MEMS (microelectrical-mechanical systems) device with elements 109 composed of segments 110 made of an absorptive, thermotropic material that may change its physical shape in response to temperature. Examples of such materials include, but are not limited to, shape memory alloys such as copper-aluminum-nickel alloy. In this exemplary embodiment, the segments 110 may be formed such that they lie flat at high temperatures, and stand up away from the surface at low temperatures. Thus, above a certain threshold temperature, the individual segments 110 may lie flat enough to come into physical contact with one another and may form continuous absorptive polarizers 109. However, it may be understood that other forms of thermotropic absorptive polarizers are also possible, including versions composed of liquid crystals or nanoengineered optical and photonic materials or so-called "metamaterials," and that these or other forms of thermotropic absorptive polarizer can be employed in place of the design shown in FIG. 8 without altering the fundamental nature, intent, or functioning of this implementation.

Figure 9:
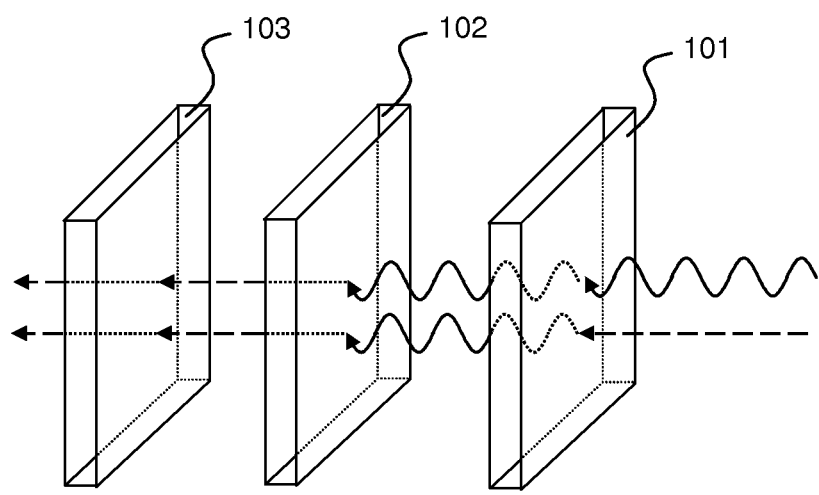
FIG. 9 is a schematic representation of an additional embodiment of a thermally switched absorptive shutter device, wherein the first polarizer is a polarity-rotating polarizer.

FIG. 9 is a schematic representation of still another embodiment of a TSAOS device, in which the outer absorptive polarizer has been replaced with a "polarity-rotating" polarizer 101. Insofar as an absorptive polarizer absorbs light of opposite polarity and a reflective polarizer reflects light of opposite polarity, a polarity-rotating polarizer may convert light of opposite polarity into light of matching polarity. Thus, the polarizer 101 may be up to 100% transmissive, and all the light that exits it may have the same polarity. In FIG. 9, incoming light of matching polarity strikes the outer polarizer 101 and is transmitted through. Also in FIG. 9, light of opposite polarity strikes the outer polarizer 101 and is "rotated" so that its polarity matches that of the outer polarity-rotating polarizer 101.

FIG. 9 depicts the operation of the embodiment in the cold state in which the polarized light enters the depolarizer 102 in its cold, organized state (e.g., a twisted nematic state) and thus the depolarizer 102 may function to rotate the polarity of all the light passing through it, to match the polarity of the inner absorptive polarizer or analyzer 103. The inner absorptive polarizer 103 may be a standard absorptive polarizer as in other embodiments previously described. Since the depolarized light matches the polarity of the inner absorptive polarizer 103, it may be transmitted through. Therefore, in this embodiment the TSAOS device may be up to 100% transmissive in the cold state. In the hot state, the depolarizer 102 may become disorganized (i.e., the liquid or isotropic state) and may not affect the polarity of the light passing through it. Therefore, since the light may be of opposite polarity to the inner absorptive polarizer 103, up to 100% of the light may be absorbed. Thus, the TSAOS device may be up to 100% absorptive in its hot state.

Figure 10:
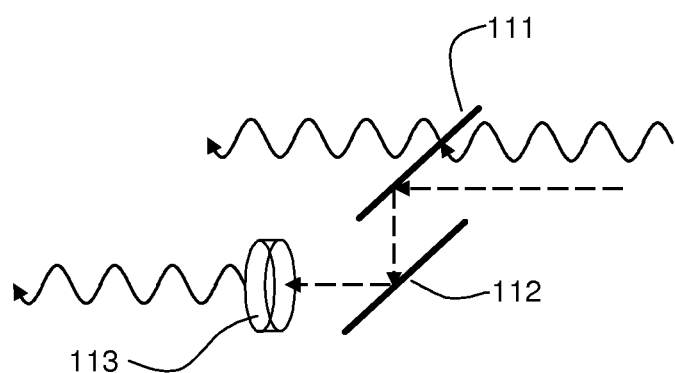
FIG. 10 is a schematic representation of an exemplary polarity-rotating polarizer in a cold state.

FIG. 10 is a schematic representation of an exemplary form of a polarity-rotating polarizer device, including a wire grid polarizer 111, a mirror 112, and a depolarizer 113. When light of matching polarity strikes the wire grid polarizer 111, it may be transmitted through. However, when light of opposite polarity strikes the wire grid polarizer 111, it may be reflected at a 45-degree angle to the mirror 112, which also may reflect the light at a 45-degree angle such that the light may be traveling once again in its original direction. At this point, the reflected light may pass through a permanent depolarizer (also known as a waveblock or waveplate) that rotates its polarity by a specific amount (usually 90 degrees). Thus, the polarity of the reflected light may now match the polarity of the transmitted light. Therefore, the polarity-rotating polarizer may transmit up to 100% of the light that strikes it, while ensuring that all of the light may be of the same polarization.

It should be appreciated that myriad other arrangements of optical components can achieve the same effect, and that other types of polarity-rotating polarizers may be discovered as well, including polarizer materials based on nanostructured optical or photonic materials, so-called "metamaterials," and other materials that function on different principles. However, the basic functioning, intent, and performance of the present implementation is not affected by the exact nature of polarity-rotating polarizer employed.

Figure 11:
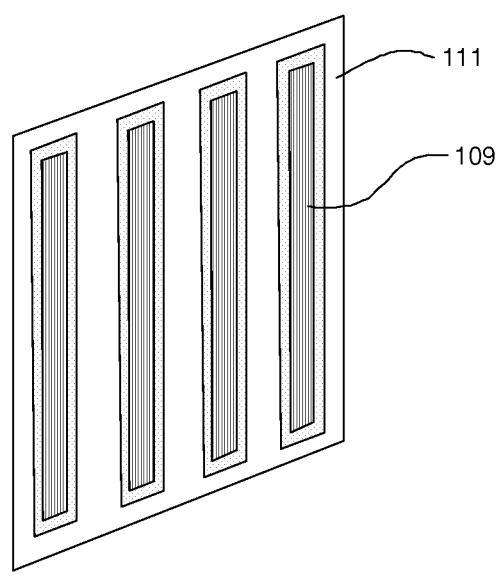
FIG. 11 is a schematic representation of an exemplary photovoltaic absorptive polarizer.

FIG. 11 is a schematic representation of still another type of absorptive polarizer, a photovoltaic polarizer, wherein, rod-shaped absorptive elements 109 have been replaced with photovoltaic strips. In one embodiment, these strips 109 may be Shottky-type diodes consisting of a thin film of low-bandgap semiconductor (e.g., germanium) on top of a thin film of high-bandgap semiconductor (e.g., silicon). However, other photovoltaic materials or devices could be substituted with no essential change to the nature or functioning of this embodiment of a TSAOS device. In this arrangement, while the photovoltaic strips 109 may absorb (for example, in the form of heat) a significant fraction of the light that hits them with opposite polarity, a significant fraction of this light may also be absorbed in the form of electrical potentials which can be harvested to create an electrical current. The design and functioning of photovoltaic devices is well described in the prior art and needs no further elaboration here.

However, it should be understood that one or more photovoltaic polarizers can be employed in the present implementation, such that a portion of the light blocked by the polarizer or polarizers can be exploited in the form of electrical power. This may occur in addition to the normal thermoabsorptive behaviors of the shutter.

A TSAOS device may be passive and self-regulating (requiring no external signals or user inputs in order to function) and thus may be considered a "smart material." The TSAOS device may also be understood as a nearly-solid-state optical switch. In some implementations, aside from a thin film of liquid crystal molecules, the switch may contain no moving parts, other than photons and electrons. The TSAOS device may regulate, based on temperature, the amount of light and radiant energy that passes through it. The shutter can thereby be used to help regulate the internal temperatures of buildings, vehicles, and other structures by controlling the reflection and absorption of solar energy or other incident light energy.

The TSAOS device may have multiple configurations. For example, the TSAOS device may be configured to transmit and absorb diffuse visible light and it may serve as an aesthetic, energy-regulating replacement for translucent building materials such as glass block, privacy glass, and textured polymers. Alternatively, the TSAOS device may be configured to transmit and absorb collimated visible light with little diffusion. In this case it may serve as an aesthetic, energy-regulating replacement for transparent building materials such as glass or polymer windows. Further, the TSAOS device may be configured to show reflection, absorption, or transmission peaks in the visible spectrum and may serve as an energy-regulating replacement for stained glass, tinted windows or window appliqués and coatings, or colored artificial light sources. The physical instantiation of a TSAOS device may be thick or thin, strong or weak, rigid or flexible, monolithic or made up of separate parts, without altering its basic function in any significant way.

In addition, the performance of a TSAOS device may be enhanced by improving its cold-state light transmission, absorption, or reflection, by increasing or decreasing its thermal conductivity and/or thermal capacity. Furthermore, the transparency of the TSAOS device may be increased in both the cold and hot states by adjusting the structure of one or both polarizing layers (e.g., by alternating stripes or spots of polarizer material with transparent material). Additionally, the transparency of the TSAOS device may be increased in the hot state, though not in the cold state, by adjusting the orientation of the polarizers with respect to one another (i.e., less than 90 degrees will produce less than 100% absorption in the hot state). The transparency of the TSAOS device may be increased or decreased in the cold state by adjusting the rotation of polarized light provided by the depolarizer. The TSAOS device may also be functionally enhanced for certain applications through the addition of optional features such as anti-reflection coatings, partial mirrors, low-emissivity coatings, concentrating lenses, air gaps or vacuum gaps, phase change materials, translucent thermal insulators including, but not limited to, foamed glass and silica aerogels, or any combination thereof.

Various polarizer types (including but not limited to stretched polymer polarizers, liquid crystal polarizers, specular absorptive polarizers, diffuse absorptive polarizers, thermotropic polarizers whose function changes with temperature, and polarity-rotating polarizers) can be combined in any number of different arrangements to achieve effects similar to those described in this application, without fundamentally deviating from the spirit of the invention. For example, the absorptive polarizers may be selected such that each has a different polarizing nature (e.g., the polarizing natures could be opposing as specular vs. diffusive or reflective vs. absorptive, at different frequencies).

Although the maximum control over energy transport for the TSAOS device may occur when the range of absorbed wavelengths is as large as possible, the addition of color filter layers can alter the transmission spectrum (i.e., the color) of the light passing through the TSAOS device, for aesthetic or other reasons. In addition, it is possible to add a reflective "color" to the surface of the TSAOS device, with minimal effect on its efficiency, by adding one or more bandblock filters to reflect particular wavelengths of light. The resulting optical properties do not closely resemble those of any other building material. It is also possible, for aesthetic, heat and light management, or other reasons, to use spectrally selective polarizers that operate only over a particular range (or multiple ranges) of wavelengths, as well as polarizers which have different polarization efficiencies and degrees of absorptivity and reflectivity over particular ranges (or multiple ranges) or wavelengths.

Although the materials and structures of a TSAOS device may be rigid, there is no requirement for rigidity in order for the TSAOS device to perform the functions described herein. Furthermore, while the various components of the TSAOS device are shown and described as being attached or in direct physical contact, the TSAOS device may also function if the components are adjacent but physically separated. Thus, while the TSAOS device can be embodied as a solid object (e.g., a window, glass block, spandrel, or movable panel) or group of solid objects (e.g., components affixed to an optical workbench), it can also be embodied as a flexible object such as, for example, a tent material, blanket, curtain, or an appliqué film which may be applied to the surface of glass windows, spandrels, or glass block building materials.

In addition, a wide variety of alternative materials can be used to manufacture the TSAOS device, including metals, ceramics, semiconductors, glasses, polymers, waxes, salts, nanostructured and microstructured photonic materials, metamaterials, liquid crystals, ices, liquids, and vapors. The device may include features designed to enhance its thermal insulation properties including, but not limited to, for example, air gaps, vacuum gaps, foams, beads, fiber pads, or aerogels. The TSAOS device may also include features designed to improve thermal sensing, response, and transition temperature accuracy capabilities, such as conductive adhesives, materials with large or small thermal masses, and phase change materials. Additionally, the TSAOS device may include features designed to improve the rate at which heat is conducted away and may be thick and rigid enough to serve as a structural component of vehicles or building walls. The TSAOS device may be wrapped around or formed upon complex surfaces and may be aesthetically enhanced with color, or it may be camouflaged to resemble more conventional building materials. Thermochromic pigments may be added to certain surfaces to indicate when they are hot or cold.

Additives, e.g., chiral liquid crystal may be included in the thermotropic depolarizer to set a preferred direction of rotation of polarized light. This may improve the speed and optical properties of the transition between states. A solvent (e.g., Merck liquid crystal solvent ZLI1132) may be used as a base to create a mixture of liquid crystals. Additionally, additives may be included in the depolarizer, for example, to improve the temperature stability of transitions or to reduce the susceptibility of the depolarizer to light or energy of particular wavelengths or ranges of wavelengths to reduce chemical susceptibility to breakdown due to UV light, to prevent the absorption of certain wavelengths of light and conversion into heat, or to mitigate changes in transition temperatures due to chemical breakdown of other components. For example, hexane and chloroform may be introduced to adjust the liquid crystal's freezing temperature or lower viscosity. Mechanical enhancements may be added to reorient components, either to face them toward or away from incoming light, or to alter their wavelength response or apparent thickness.

The exact arrangement of the various layers may vary and (depending on the materials and wavelengths selected) different layers can be combined as single layers, objects, devices, or materials, without altering the essential structure and function of a TSAOS device. Although the description above contains many specificities, these should not be construed as limiting the scope of the invention but rather construed as merely providing illustrations of certain embodiments of this invention. There are various possibilities for making the TSAOS device of different materials, and in different configurations. For example, the structure could be inflatable or could be optimized for use underwater or in outer space instead of in normal air (e.g., atmospheric pressure).

In addition, the TSAOS device could incorporate one or more additional polarizers, whether parallel or rotated at some angle to one another and to the original two polarizers, in order to modify the polarization state of light at various positions within the TSAOS device. Numerous combinations of polarizer angles and liquid crystal molecule orientation can be used to produce different optical effects (e.g., absorptive when cold instead of absorptive when hot, different colors in the transmissive state, etc.). The depolarizer can employ a wide variety of different combinations of nematic, twisted nematic, smectic, solid/crystalline, discotic, chiral, and other physical/molecular states, as well as alternative liquid crystal technologies such as polymer stabilized cholesterics, polymer nematic, and guest-host cells with or without electric fields, textured surfaces, internal guide wires, or other means to reorient the component molecules.

It is possible to make depolarizers which are diffusive in the cold state and specular in the hot state (and reverse), are opalescent in one or both states, change the color balance of the transmitted and absorbed light differently as the temperature changes, and similarly have different color balances when in the hot and cold state. Additionally, it is possible to use polarizers that act on any of the various polarizations of light, (e.g. circular, elliptical, and linear). Such embodiments are explicitly claimed as part of the present invention.

Numerous other variations exist which do not affect the core principles of the invention. For example, the depolarizer or one or more polarizers could be mechanical in nature, physically rotating by 90 degrees (or by some other amount) in response to a shift in temperature. Alternatively, the thermotropic depolarizer could be designed such that its temperature affected the range of wavelengths over which it operated, rather than (or in addition to) affecting its ability to depolarize. For example, a waveblock made from a material with very high coefficient of thermal expansion would have this property. Any or all of the layers in the device could be composed of doped, nanostructured, or microstructured materials including but not limited to custom photonic crystals.

The use of a TSAOS device as a thermally-regulating building material may be enhanced by careful positioning of the device. For example, the TSAOS may be placed under the eave on the south face of a house so that the device is in full sunlight during winter days and is shadowed by the eave on summer days when the sun is higher in the sky. Alternatively, the TSAOS device can be used in place of traditional skylights, or as a panel or appliqué affixed to ordinary glass windows or glass blocks. In some cases, it may also be desirable to place opaque, energy-absorbing materials behind a thermoabsorptive material or device in order to maximize the absorption of heat energy in the cold (transparent) state. In other cases, it may also be desirable to place reflective materials behind a thermoabsorptive material or device in order to minimize the absorption of heat energy in the cold (transparent) state.

While a TSAOS device as disclosed herein may be used as a building material, particularly for the exterior skin of structures exposed to sunlight, it can be used in myriad other ways as well. For example, a thermoabsorptive material or device could be incorporated into shower doors such that the presence of hot water or steam causes the door to become opaque, diffusive, translucent, or screening, guaranteeing the privacy of the occupant. Similarly, a coffee pot could be made thermoabsorptive, such that the presence of hot coffee in the pot would be obvious to any observer.

In addition, a TSAOS device can be used to display temperature-controlled images. Such images, including text, line drawings, corporate logos, and monochromatic photographs, can be produced by arranging thermoabsorptive materials in the shape of the desired image, or by selectively varying the temperature response of the thermoabsorptive materials in particular areas so that the image appears at particular temperature or range of temperatures, or by manipulating liquid crystal alignment layers or other molecular alignment processes such that the material's thermoabsorptive response is enhanced or reduced in particular areas to form the image, or by other methods which do not fundamentally alter the nature of the image or its underlying technology. Such images can include optical components such as mirrors, half-mirrors, gratings, grids, and fresnel lenses, such that the thermoabsorptive material or device exhibits markedly different optical properties at high temperature than at low temperature.

While several exemplary embodiments are depicted and described herein, it should be understood that the present invention is not limited to these particular configurations. Optional components such as antireflective coatings or films, lenses, prismatic films, and directionally sensitive polarizers, may be added or moved to suit the needs of a particular application or a particular manufacturing method, and degraded forms of some embodiments can be produced by deleting or substituting certain components. Although various embodiments of this invention have been described above with a certain degree of particularity, or with reference to one or more individual embodiments, those skilled in the art could make numerous alterations to the disclosed embodiments without departing from the spirit or scope of this invention.

It is intended that all matter contained in the above description and shown in the accompanying drawings shall be interpreted as illustrative only of particular embodiments and not limiting. All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Stated percentages of light transmission, absorption, and reflection shall be interpreted as illustrative only and shall not be taken to be limiting.

Furthermore, although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. The various embodiments, operations, components and configurations disclosed herein are generally exemplary rather than limiting in scope. Accordingly, the proper scope of the invention is defined by the following claims.

What is claimed is:

1. A thermally switchable device for use in a building or vehicle for regulating transmission and absorption of solar radiant energy incident on the building or vehicle, the device comprising
    two absorptive polarizers oriented with respect to each other such that respective polarization directions of the absorptive polarizers are orthogonal; and
    a thermotropically-actuated liquid crystal positioned between the two absorptive polarizers that transitions between an ordered, twisted nematic state and a disordered, isotropic state at a threshold surface temperature caused by solar heating of the device, wherein
    the liquid crystal has an insignificant effect on incident solar energy in the isotropic state and acts as a depolarizer in the twisted nematic state to rotate a first polarity of solar radiant energy passing through a first of the absorptive polarizers to a second polarity oriented to pass through a second of the absorptive polarizers.

2. The device of claim 1, wherein the two absorptive polarizers each define transparent areas and allow transmission of unpolarized incident solar radiant energy through the device.

3. The device of claim 1, wherein the two absorptive polarizers together have one or more of the following properties: different polarization efficiencies, different polarization responses, and polarization effects at different wavelengths.

4. The device of claim 1 further comprising an electrotropic control system to supplement and actuate the thermotropically-actuated liquid crystal outside the threshold surface temperature.

5. The device of claim 1, wherein a first of the two absorptive polarizers absorbs up to 50% of the incident solar radiant energy and transmits a majority of non-absorbed incident solar radiant energy.

6. The device of claim 1, wherein a second of the two absorptive polarizer absorbs up to 100% of the solar radiant energy transmitted through the first absorptive polarizer when the liquid crystal is in the disordered, isotropic state and transmits up to 100% of the solar radiant energy transmitted through the first absorptive polarizer when the liquid crystal is in the ordered, twisted nematic state.

7. The device of claim 1 further comprising a transparent substrate that supports the two absorptive polarizers and the thermotropically-actuated liquid crystal.

8. The device of claim 7, wherein the transparent substrate is a rigid plate.

9. The device of claim 7, wherein the transparent substrate further comprises a longpass filter, a shortpass filter, or a bandpass filter and is transparent only to certain wavelengths of the radiant energy.

10. An insulating glass unit that regulates transmission and absorption of solar radiant energy emitted from the sun comprising
    a first plate of glass;
    a second plate of glass;
    a first absorptive polarizer having a first polarization direction positioned between the first plate of glass and the second plate of glass;
    a second absorptive polarizer positioned between the first plate of glass and the second plate of glass having a second polarization direction oriented orthogonally with respect to the first polarization direction of the first absorptive polarizer; and
    a thermotropically-actuated liquid crystal positioned between the first absorptive polarizer and the second absorptive polarizer that transitions between an ordered, twisted nematic state and a disordered, isotropic state at a threshold surface temperature caused by solar heating of the insulating glass unit, wherein
    the liquid crystal has an insignificant effect on incident solar radiant energy in the isotropic state and acts as a depolarizer in the twisted nematic state to rotate a first polarity of solar radiant energy passing through the first absorptive polarizer to a second polarity oriented to pass through the second absorptive polarizer.

11. The insulating glass unit of claim 10, wherein the first and second absorptive polarizers each define transparent areas and allow transmission of unpolarized incident solar radiant energy through the insulating glass unit.

12. The insulating glass unit of claim 10, wherein the first and second absorptive polarizers together have one or more of the following properties: different polarization efficiencies, different polarization responses, and polarization effects at different wavelengths.

13. The insulating glass unit of claim 10 further comprising an electrotropic control system to supplement and actuate the thermotropically-actuated liquid crystal outside the threshold surface temperature.

14. The insulating glass unit of claim 10, wherein the first absorptive polarizer absorbs up to 50% of the incident solar radiant energy and transmits a majority of non-absorbed incident solar radiant energy.

15. The insulating glass unit of claim 10, wherein the second absorptive polarizer absorbs up to 100% of the solar radiant energy transmitted through the first absorptive polarizer when the liquid crystal is in the disordered, isotropic state and transmits up to 100% of the solar radiant energy transmitted through the first absorptive polarizer when the liquid crystal is in the ordered, twisted nematic state.

16. A spandrel that regulates transmission and absorption of solar radiant energy emitted from the sun comprising
    a plate of glass;
    a first absorptive polarizer having a first polarization direction positioned adjacent the first plate of glass;
    a second absorptive polarizer positioned parallel with the first absorptive polarizer and having a second polarization direction oriented orthogonally with respect to the first polarization direction of the first absorptive polarizer; and
    a thermotropically-actuated liquid crystal positioned between the first absorptive polarizer and the second absorptive polarizer that transitions between an ordered, twisted nematic state and a disordered, isotropic state at a threshold surface temperature caused by solar heating of the spandrel, wherein
    the liquid crystal has an insignificant effect on incident solar radiant energy in the isotropic state and acts as a depolarizer in the twisted nematic state to rotate a first polarity of solar radiant energy passing through the first absorptive polarizer to a second polarity oriented to pass through the second absorptive polarizer.

17. The spandrel of claim 16, wherein the first and second absorptive polarizers each define transparent areas and allow transmission of unpolarized incident solar radiant energy through the insulating glass unit.

18. The spandrel of claim 16, further comprising an electrotropic control system to supplement and actuate the thermotropically-actuated liquid crystal outside the threshold surface temperature.

19. The spandrel of claim 16, wherein the first absorptive polarizer absorbs up to 50% of the incident solar radiant energy and transmits a majority of non-absorbed incident solar radiant energy.

20. The spandrel of claim 16, wherein the second absorptive polarizer absorbs up to 100% of the solar radiant energy transmitted through the first absorptive polarizer when the liquid crystal is in the disordered, isotropic state and transmits up to 100% of the solar radiant energy transmitted through the first absorptive polarizer when the liquid crystal is in the ordered, twisted nematic state.

* * * * *